(12) United States Patent
Yasumoto

(10) Patent No.: US 10,871,310 B2
(45) Date of Patent: Dec. 22, 2020

(54) UNDERGROUND HEAT EXCHANGER

(71) Applicant: ECO-PLANNER CO., LTD., Fukui (JP)

(72) Inventor: Satoshi Yasumoto, Fukui (JP)

(73) Assignee: ECO-PLANNER CO., LTD., Fukui (JP)

( * ) Notice: Subject to any disclaimer, the term of this patent is extended or adjusted under 35 U.S.C. 154(b) by 189 days.

(21) Appl. No.: 16/098,039

(22) PCT Filed: Oct. 23, 2017

(86) PCT No.: PCT/JP2017/038122
§ 371 (c)(1),
(2) Date: Oct. 31, 2018

(87) PCT Pub. No.: WO2018/079463
PCT Pub. Date: May 3, 2018

(65) Prior Publication Data
US 2019/0154307 A1    May 23, 2019

(30) Foreign Application Priority Data
Oct. 26, 2016    (JP) .................................. 2016-209747

(51) Int. Cl.
*B61D 27/00*    (2006.01)
*F24T 10/17*    (2018.01)
(Continued)

(52) U.S. Cl.
CPC .............. *F24T 10/17* (2018.05); *F24T 10/00* (2018.05); *F28D 20/0043* (2013.01);
(Continued)

(58) Field of Classification Search
CPC ....... F24T 10/17; F24T 10/00; F28D 20/0043; F28D 1/06; F28D 7/0008; F28D 7/10;
(Continued)

(56) References Cited

U.S. PATENT DOCUMENTS 2,128,635 A * 8/1938 Charch .................... C08J 5/127
428/460
3,062,289 A * 11/1962 Eades .................. E21B 36/005
166/61

(Continued)

FOREIGN PATENT DOCUMENTS

CN          2646628 Y    10/2004
CN          203132205 U   8/2013
(Continued)

*Primary Examiner* — Claire E Rojohn, III
(74) *Attorney, Agent, or Firm* — R. Neil Sudol; Henry D. Coleman

(57) ABSTRACT

An underground heat exchanger has a bottomed tubular flexible bag body accommodated in an accommodation hole portion in the ground, and an outer tube accommodated in the accommodation hole portion, vertically extending along an outer surface portion of the bag body and communicating in its lower end with a lower end of the bag body. The outer surface portion of the hardening resin bag body can cover an inner wall portion of the accommodation hole portion in a closely contact state with the bag body being inflated. The bag body is hardened in the covering state, a lining tubular body formed by the hardening can form a liquid storage tank for storing a heat medium liquid in its internal space, and the outer tube is pinched between the outer surface portion of the bag body and the inner wall portion.

7 Claims, 30 Drawing Sheets

(51) Int. Cl.
*F28F 21/06* (2006.01)
*F24T 10/00* (2018.01)
*F28D 20/00* (2006.01)
*F28D 7/00* (2006.01)
*F28D 7/10* (2006.01)
*F28D 1/06* (2006.01)

(52) U.S. Cl.
CPC .............. *F28F 21/062* (2013.01); *F28D 1/06* (2013.01); *F28D 7/0008* (2013.01); *F28D 7/10* (2013.01); *F28F 2255/02* (2013.01); *Y02E 10/10* (2013.01); *Y02E 60/14* (2013.01); *Y02E 70/30* (2013.01)

(58) Field of Classification Search
CPC ..... F28F 21/062; F28F 2255/02; Y02E 10/10; Y02E 60/142; Y02E 70/30
USPC .......................................................... 165/45
See application file for complete search history.

(56) References Cited

U.S. PATENT DOCUMENTS

| | | | | |
|---|---|---|---|---|
| 3,183,675 A * | 5/1965 | Schroeder | ............... | E02D 19/14 405/130 |
| 3,609,980 A * | 10/1971 | Bowers | ..................... | E02D 7/00 405/232 |
| 4,050,509 A * | 9/1977 | Bienert | ............... | F28D 15/0266 165/45 |
| 4,325,228 A * | 4/1982 | Wolf | ....................... | F25B 30/06 62/260 |
| 4,441,556 A * | 4/1984 | Powers | ................. | E21B 33/134 166/290 |
| 4,574,875 A * | 3/1986 | Rawlings | ............ | F28D 20/0052 165/45 |
| 4,741,388 A * | 5/1988 | Kuroiwa | ............. | F28D 20/0052 165/45 |
| 4,909,323 A * | 3/1990 | Hastings | ................ | E21B 33/146 166/242.3 |
| 5,031,706 A * | 7/1991 | Spektor | ................... | E21B 4/145 175/19 |
| 5,161,626 A * | 11/1992 | Laffkas | .................... | F24T 10/15 175/22 |
| 5,183,100 A * | 2/1993 | Harrell, Jr. | .............. | F24T 10/17 165/45 |
| 5,322,115 A * | 6/1994 | Hildebrand | ........... | E21B 36/003 165/45 |
| 5,435,387 A * | 7/1995 | Roberts | ................... | E21B 17/08 138/114 |
| 5,435,395 A * | 7/1995 | Connell | ................ | E21B 17/025 166/384 |
| 5,477,914 A * | 12/1995 | Rawlings | ................ | F24T 10/15 165/45 |
| 5,561,985 A * | 10/1996 | Cochran | ................. | F24T 10/15 62/260 |
| 5,623,986 A * | 4/1997 | Wiggs | ..................... | F24T 10/15 165/45 |
| 6,220,344 B1 * | 4/2001 | Beykirch | ................ | F28D 7/022 165/154 |
| 6,672,371 B1 * | 1/2004 | Amerman | ........... | F28D 20/0052 165/45 |
| 6,860,320 B2 * | 3/2005 | Johnson, Jr. | ............ | F28F 27/00 165/45 |
| 6,955,219 B2 * | 10/2005 | Johnson, Jr. | ............... | E21B 7/24 166/286 |
| 7,343,753 B2 * | 3/2008 | Kidwell | .................... | F28D 7/12 62/260 |
| 7,578,140 B1 * | 8/2009 | Wiggs | ..................... | F25B 30/06 165/45 |
| D648,835 S * | 11/2011 | Ruot | ............................. | D23/259 |
| 8,256,531 B1 * | 9/2012 | Biggs | ..................... | F24T 10/10 175/15 |
| 8,261,551 B2 * | 9/2012 | Brewington | ........... | F24T 10/15 60/641.2 |
| 8,529,156 B2 * | 9/2013 | Biggs | ..................... | F24T 10/10 405/184 |
| 8,776,867 B2 * | 7/2014 | Stojanowski | ....... | F28D 20/0056 165/45 |
| 8,936,113 B2 * | 1/2015 | Brice | ...................... | F24T 10/15 175/296 |
| 9,121,630 B1 * | 9/2015 | Fraim | ..................... | F25B 49/02 |
| 9,291,286 B2 * | 3/2016 | Huck | ...................... | F16L 1/028 |
| 9,777,969 B2 * | 10/2017 | Yang | ................... | F28D 20/0052 |
| 9,897,347 B2 * | 2/2018 | Breidenbach | ........... | E21B 10/44 |
| 9,897,387 B2 * | 2/2018 | Glass | ...................... | F28D 7/103 |
| 9,909,783 B2 * | 3/2018 | Jensen | ................... | F24T 10/15 |
| 10,196,792 B2 * | 2/2019 | Schmand | ................... | E02D 3/11 |
| 2002/0102371 A1 * | 8/2002 | DeMeyer | ................. | F16L 9/12 428/34.1 |
| 2005/0061472 A1 * | 3/2005 | Guynn | .................... | F24T 10/15 165/45 |
| 2007/0029066 A1 * | 2/2007 | Kidwell | .................. | F28D 7/026 165/45 |
| 2009/0025902 A1 * | 1/2009 | Favier | ..................... | F24T 10/15 165/45 |
| 2011/0036112 A1 * | 2/2011 | Livingston | .............. | F24T 10/17 62/260 |
| 2011/0265989 A1 | 11/2011 | Alexandersson | | |
| 2014/0246168 A1 * | 9/2014 | Hata | ....................... | F24T 10/17 165/45 |
| 2016/0061515 A1 * | 3/2016 | Wiemer | ............... | B67D 1/0063 165/135 |

FOREIGN PATENT DOCUMENTS

| | | | | |
|---|---|---|---|---|
| CN | 203361131 U | | 12/2013 | |
| DE | 3139868 A1 | | 4/1983 | |
| EP | 1486741 A1 | | 12/2004 | |
| JP | 60-93260 A | | 5/1985 | |
| JP | H 10317389 | | 12/1998 | |
| JP | 2004-20017 A | | 1/2004 | |
| JP | 2013-100935 A | | 5/2013 | |
| JP | 2013-108658 A | | 6/2013 | |
| JP | 2013108658 A | * | 6/2013 | ............... F28F 1/08 |
| JP | 2015-517643 A | | 6/2015 | |
| JP | 2016-217688 A | | 12/2016 | |
| WO | WO 2000/037862 A1 | | 6/2000 | |

\* cited by examiner

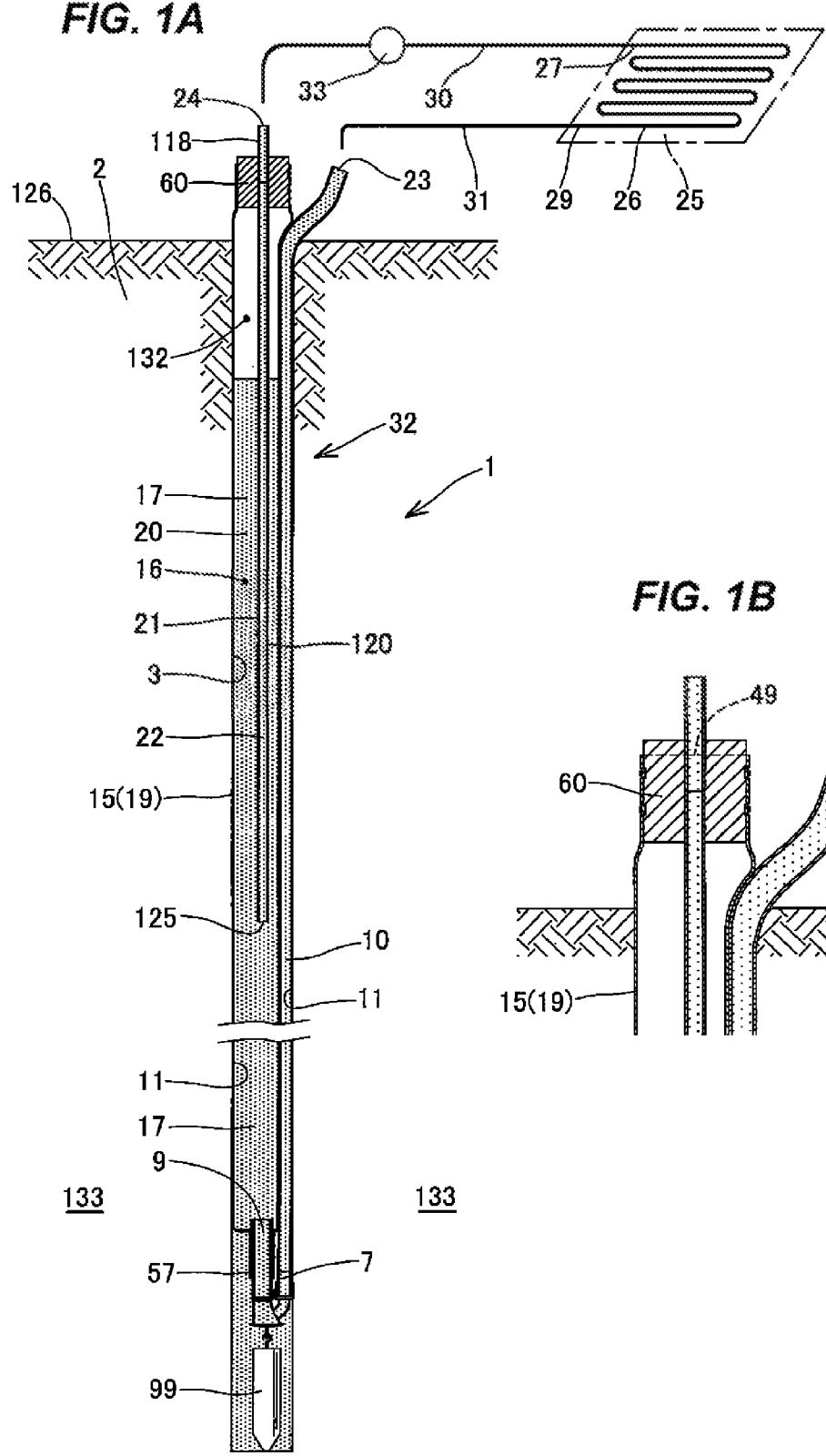

UNDERGROUND HEAT EXCHANGER

TECHNICAL FIELD

The present invention relates to an underground heat exchanger which can achieve an improvement of a heat efficiency.

BACKGROUND ART

The structure disclosed in Patent Literature 1 has been proposed as an example of an underground heat exchanger which utilizes underground heat as a heat source. The underground heat exchanger a is formed by excavating a borehole b having predetermined hole diameter and depth while filling muddy water therein as shown in FIG. 32. A bottomed tubular flexible bag body d which is made of a watertight material and can be formed into the same shape as the borehole b is inserted into an inner portion of the borehole b formed as mentioned above. Thereafter, an inner tube e is inserted until its lower end f reaches a bottom portion g of the borehole b. Thereafter, a heat medium liquid j is injected into an inner portion of the flexible bag body d through the inner tube e so as to inflate the flexible bag body d while removing the muddy water via the borehole b by driving a sludge removal pump (not shown) arranged in a land surface portion side. Thus, a liquid storage tank n is formed by bringing the flexible bag body d into close contact with a hole bottom portion k and a hole wall m as shown in FIG. 32. After the heat medium liquid j is injected and filled as mentioned above, the inner tube e serves as an extraction tube in an air conditioner (not shown) side. Further, the underground heat exchanger which can supply and discharge the heat medium liquid to and from the air conditioner side can be constructed by piping a return tube p within the flexible bag body d.

However, the underground heat exchanger has had room for improvement in the light of improvement of the heat efficiency. More specifically, when heating a building during the winter season, the heat medium liquid j within the liquid storage tank n is sucked by a lower end q of the return tube p and supplied to the air conditioner by driving the pump, and the heat medium liquid having a temperature reduced by the air conditioner moves toward a bottom portion r of the liquid storage tank n through the inner tube e and flows into the liquid storage tank n in the bottom portion r. Since the temperature of the heat medium liquid j moving toward the lower end f in the inner tube e is lower than the temperature of the heat medium liquid j within the liquid storage tank n, heat transfer is generated in an entire circumference surface s of the inner tube e from the heat medium liquid j within the liquid storage tank n toward the heat medium liquid j within the inner tube e. As a result, the temperature of the heat medium liquid j which is raised by the heat transfer from a circumferential underground t having a relatively high temperature to the heat medium liquid j within the liquid storage tank n is lowered. The temperature of the heat medium liquid j within the liquid storage tank n is higher toward its upper side, however, the heat medium liquid within the inner tube e draws heat from the heat medium liquid j within the liquid storage tank n on the basis of the heat transfer during the movement toward the bottom portion r of the liquid storage tank in the portion having the high temperature distribution. As a result, there has been a problem that the heat efficiency of the underground heat exchanger has been sometimes lowered.

On the contrary, in the summer season, the temperature of the heat medium liquid j within the liquid storage tank n is relatively lower than the temperature of a heat discharged region in the air conditioner. As a result, the heat medium liquid j passing through the air conditioner and temperature raised by the driving of the pump moves toward the bottom portion r of the liquid storage tank n through the inner tube e and flows into the liquid storage tank n in the bottom portion r. Therefore, the heat transfer to the heat medium liquid j within the liquid storage tank n is generated in the entire circumference surface s of the inner tube e from the heat medium liquid j within the inner tube e which is relatively high in temperature, and the heat medium liquid j in the liquid storage tank n is warmed up. As mentioned above, the heat efficiency of the underground heat exchanger is deteriorated.

According to the underground heat exchanger a structured such that the inner tube e for moving the heat medium liquid supplied from the air conditioner side is arranged within the liquid storage tank n in its vertical direction as mentioned above, the heat transfer is generated from the heat medium liquid j within the liquid storage tank n toward the inside of the liquid storage tank n in the winter season. On the contrary, the heat transfer is generated from the heat medium liquid j within the inner tube e toward the heat medium liquid j within the liquid storage tank n in the summer season. As a result, there has been a problem that leads to reduction in the heat efficiency of the underground heat exchanger a.

It can be thought to coat the inner tube e with the heat insulating material in the same manner as described in paragraph 0033 of Patent Literature 2. However, in the case that the inner tube is coated with the heat insulating material, a volumetric capacity within the liquid storage tank n is reduced at that degree, thereby lowering the heat efficiency of the underground heat exchanger at the reduced volumetric capacity.

Further, due to the following reason, there has been a problem that the longer the bottomed tubular flexible bag body d is, the harder the work for inserting the inner tube e or the return tube p into the flexible bag body d is or the work is practically impossible. More specifically, since the flexible tubular body d inserted into the inner portion of the borehole which is filled with the muddy water is in a stare of being crushed with the water pressure, the lower end of the inner tube e or the return tube p comes into contact with each of the flexible bag body d in the crushed state at the inserting time even if the inner tube e or the return tube p intends to be inserted into the flexible bag body d. As a result, the insertion is practically impossible.

Consequently, it is thought to carry out the work for inserting the inner tube e or the return tube p into the flexible bag body d on the ground and thereafter insert the flexible bag body d in a state in which the inner tube e or the return tube p is inserted, into the inner portion of the borehole. However, in this case, it is necessary to secure a wide work space around a construction field in the case that the flexible bag body d is long, and this structure has not been practical.

CITATION LIST

Patent Literature

PATENT LITERATURE 1: Japanese Unexamined Patent Publication No. H10-317389

PATENT LITERATURE 2: Japanese Unexamined Patent Publication No. 2015-517643

SUMMARY OF INVENTION

Technical Problem

The present invention is developed by taking the conventional problem into consideration, and an object of the present invention is to provide an underground heat exchanger which can expect improvement of heat efficiency.

Solution to Problem

In order to achieve the object mentioned above, the present invention employed the following means.

More specifically, a first aspect of an underground heat exchanger according to the present invention is provided with a bottomed tubular flexible bag body which is accommodated in an accommodation hole portion disposed in the ground in a vertical direction, and extends in the vertical direction, and an outer tube which is accommodated in the accommodation hole portion, extends in the vertical direction along an outer surface portion of the bag body and is communicated in its lower end with a lower end of the bag body, and is characterized in that the bag body is made of a hardening resin, the outer surface portion of the bag body can cover an inner wall portion of the accommodation hole portion in a closely contact state in a state in which the bag body is inflated, the bag body is structured such as to be hardened in the covering state, a lining tubular body formed by the hardening can form a liquid storage tank for storing a heat medium liquid in its internal space, and the outer tube is structured such as to be pinched between the outer surface portion of the bag body and the inner wall portion.

A second aspect of the underground heat exchanger according to the present invention is provided with a bottomed tubular flexible bag body which is accommodated in an accommodation hole portion disposed in the ground in a vertical direction, and extends in the vertical direction, and an outer tube which is accommodated in the accommodation hole portion, extends in the vertical direction along an outer surface portion of the bag body and is communicated in its lower end with a lower end of the bag body. The bag body is structured such that a core member obtained by impregnating a flexible base member with a liquid hardening resin is accommodated between a flexible inner bag made of resin and a flexible outer bag made of resin. Further, the outer surface portion of the bag body can cover an inner wall portion of the accommodation hole portion in a closely contact state in a state in which the bag body is inflated, the bag body is structured such as to be hardened in the covering state, and a lining tubular body formed by the hardening can form a liquid storage tank for storing a heat medium liquid in its internal space. Further, the outer tube is structured such as to be pinched between the outer surface portion of the bag body and the inner wall portion.

A third aspect of the underground heat exchanger according to the present invention is structured such that a bag body having a bottomed tubular flexibility and made of a hardening resin is accommodated in an accommodation hole portion which is provided on the ground in a vertical direction, an outer tube extending along an outer surface portion of the bag body in the vertical direction and communicated its lower end with a lower end of the bag body is accommodated in the accommodation hole portion, the outer tube is in a state of being pinched between a desired width portion of the outer surface portion of the bag body as seen from a circumferential direction and an inner wall portion of the accommodation hole portion, and the other portion than the desired width portion of the outer surface portion is in a state of covering the inner wall portion in a closely contact state. Further, the bag body is structured such as to be hardened in the covering state, and a lining tubular body formed by the hardening is structured such as to form a liquid storage tank which can store a heat medium liquid in its internal space. Further, an inner tube is structured such as to be arranged in an upper portion of the liquid storage tank in a state of sinking its lower end portion into the heat medium liquid within the liquid storage tank, an upper end of the outer tube is structured such as to be connected to one end of a heat absorbing and radiating tube portion which can radiate heat in an area where heat radiation is required and can absorb heat in an area where heat absorption is required, an upper end of the inner tube is structured such as to be connected to the other end of the heat absorbing and radiating tube portion, and a pump for circulating the heat medium liquid is interposed.

A fourth aspect of the underground heat exchanger according to the present invention is characterized in that an inner peripheral surface of the lining tubular body is formed into a concavo-convex surface in the first aspect, the second aspect or the third aspect.

A fifth aspect of the underground heat exchanger according to the present invention is provided with a bottomed tubular flexible bag body which is accommodated in an accommodation hole portion disposed in the ground in a vertical direction, and extends in the vertical direction, and an outer tube which is accommodated in the accommodation hole portion, extends in the vertical direction along an outer surface portion of the bag body and communicates at its lower end with a lower end of the bag body, and is characterized in that the bag body has a water proofing property and can form a liquid storage tank for storing the heat medium liquid, an outer surface portion of the bag body can cover in a closely contact state an inner wall portion of the accommodation hole portion, in a state in which the heat medium liquid is stored in the bag body and the bag body is inflated, and the outer tube is structured such as to be pinched between the outer surface portion of the bag body and the inner wall portion.

Effect of the Invention

The present invention is provided with a basic structure including the bottomed tubular flexible bag body which is accommodated in the accommodation hole portion disposed in the ground in the vertical direction, and extends in the vertical direction, and the outer tube which is accommodated in the accommodation hole portion, extends in the vertical direction along the outer surface portion of the bag body and is communicated in its lower end with a lower end of the bag body. Therefore, according to the present invention, it is possible to provide the underground heat exchanger which can expect an improvement of a heat efficiency. Further, since the bag body is gathered together with the outer tube in such a manner as to envelop the outer tube and both the elements can be collectively accommodated within the accommodation hole portion, it is possible to easily construct the liquid storage tank for the underground heat exchanger.

BRIEF DESCRIPTION OF DRAWINGS

FIGS. 1A and 1B are explanatory views describing an underground heat exchanger according to the present invention.

DESCRIPTION OF EMBODIMENT

Embodiment 1

Figure 2A:
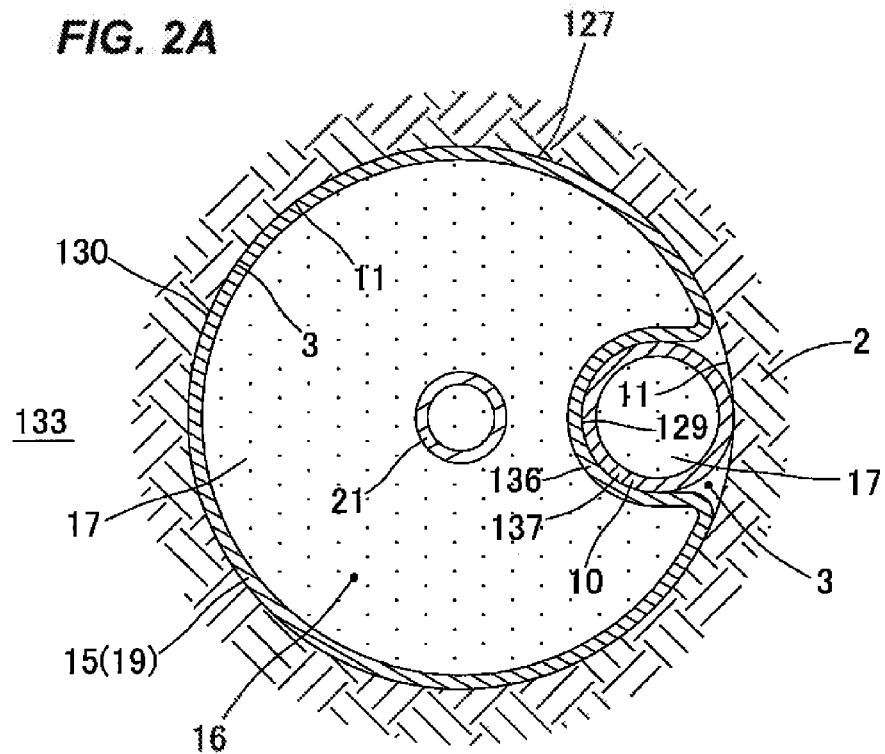
FIGS. 2A and 2B are transverse cross sectional views of upper and lower sides in a state in which a lining tubular body is formed.
Figure 2B:
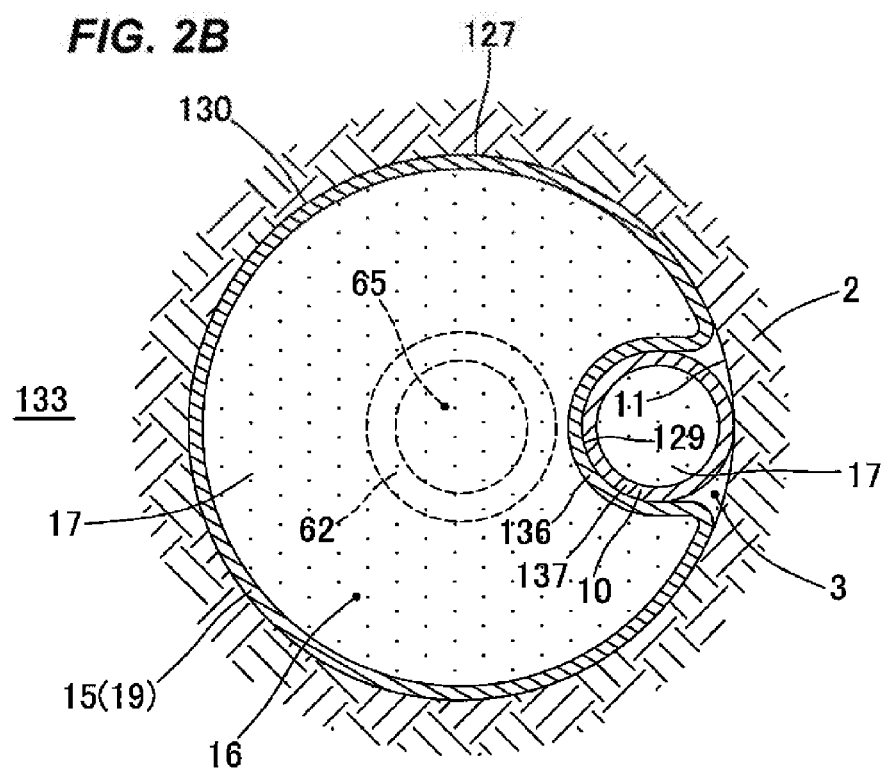
Figure 3:
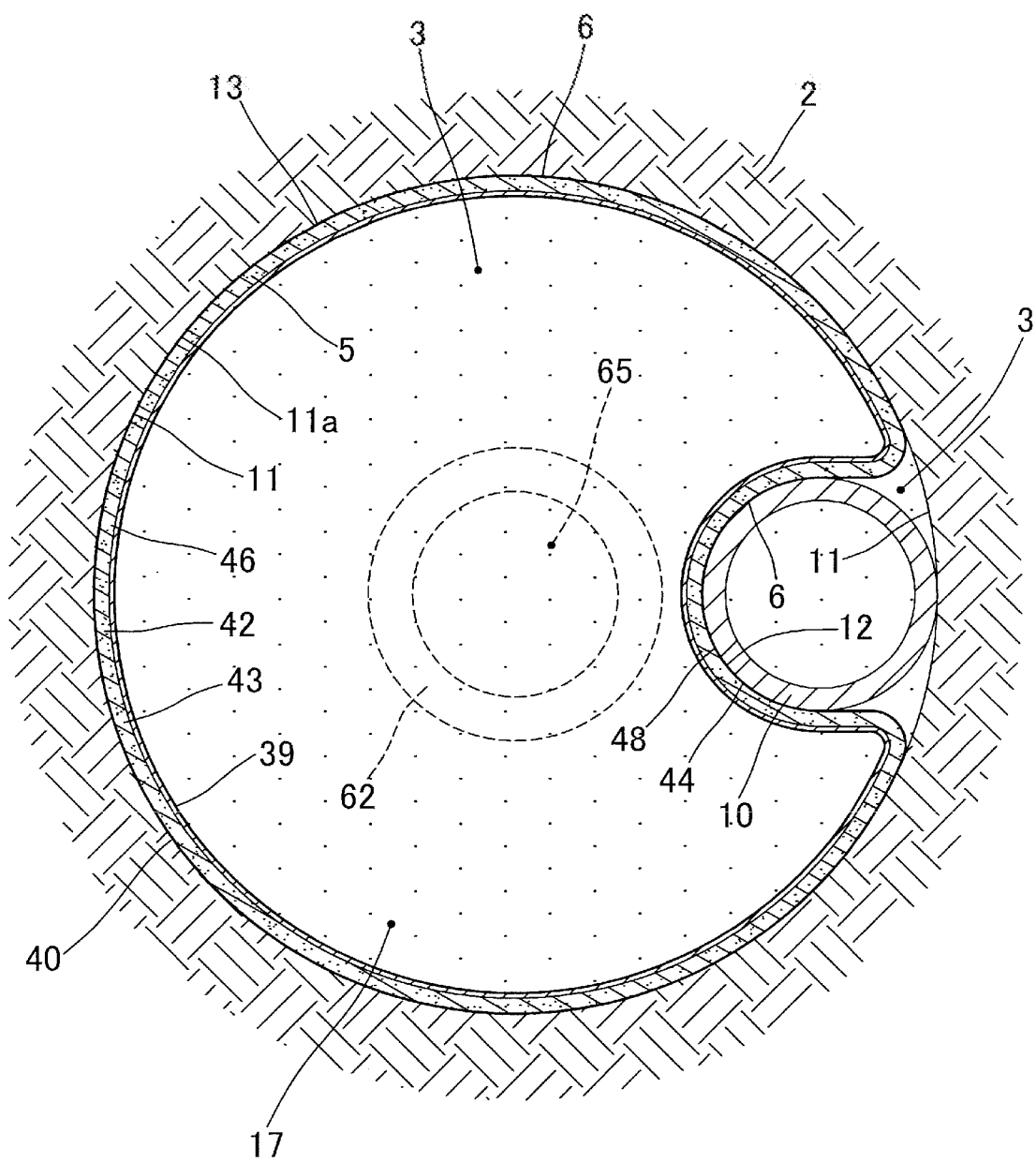
FIG. 3 is a transverse cross sectional view showing a state in which an outer surface portion of a bag body covers a surface portion of an outer tube and an inner wall portion of an accommodation hole portion.
Figure 6A:
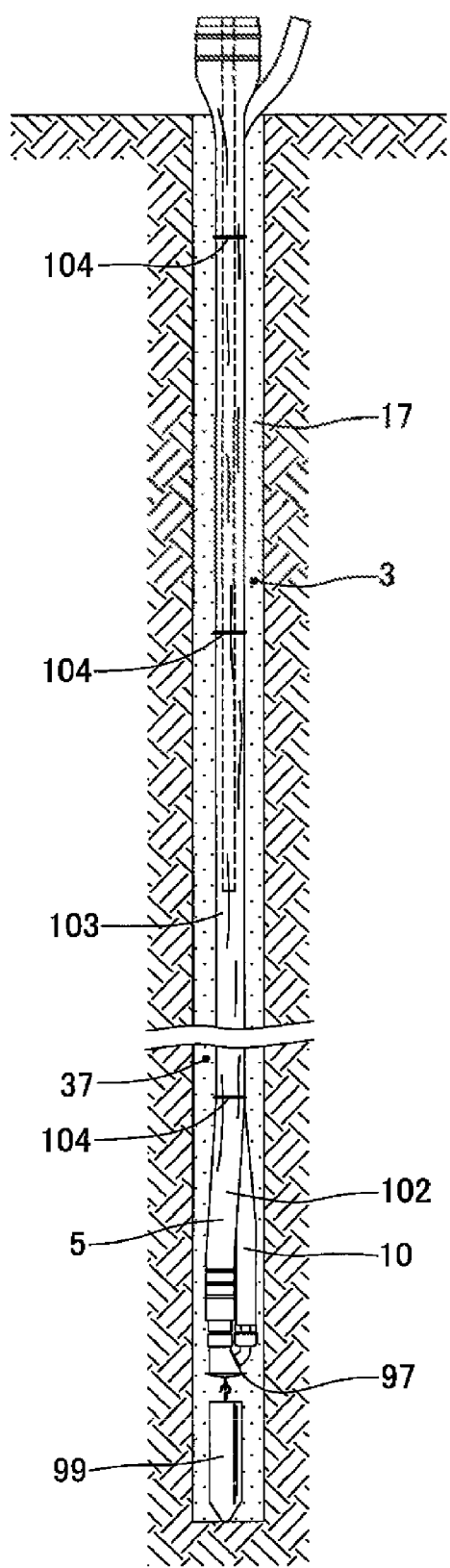
FIGS. 6A and 6B are explanatory views of a partial cross section showing a state in which a lining tubular body is removed after the accommodation as mentioned above.
Figure 6B:
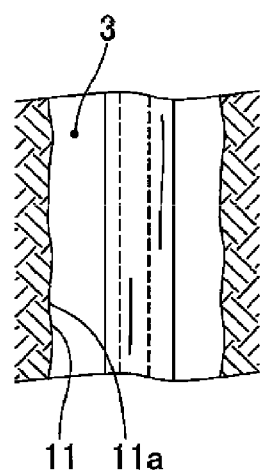

In FIGS. 1A, 1B, 2A, 2B, 3, 6A and 6B, an underground heat exchanger 1 according to the present invention utilizes as a heat source an underground heat which is kept averagely at 15° C. throughout the year, and is provided with a bottomed tubular flexible bag body 5 which is accommodated in an accommodation hole portion 3 arranged on the ground 2 in a vertical direction and extends in the vertical direction, and an outer tube 10 which is accommodated in the accommodation hole portion 3, extends along an outer surface portion 6 of the bag body 5 in the vertical direction and is communicates at its lower end 7 with a lower end 9 of the bag body 5, as shown in FIGS. 6A and 6B. Further, the outer tube 10 is structured such as to be pinched between the outer surface portion 6 of the bag body 5 and an inner wall portion 11 of the accommodation hole portion 3. More specifically, as shown in FIG. 3, the outer tube 10 is structured such as to be pinched between a desired width portion 12 as seen in a circumferential direction in the outer surface portion 6 of the bag body 5 and the inner wall portion 11 of the accommodation hole portion 3, and the other portion 13 than the desired width portion 12 of the outer surface portion 6 is structured such as to be in a state of covering the inner wall portion 11 in a closely contact state.

Further, the bag body 5 is structured such as to be hardened in this covered state, and is structured such that a lining tubular body 15 (FIGS. 1A, 1B, 2A and 2B) formed by the hardening forms a liquid storage tank 19 which can store a heat medium liquid 17 in an internal space 16 thereof, and an inner tube 21 is arranged in an upper portion 20 of the liquid storage tank 19 in a state in which a lower end side portion 22 of the inner tube 21 is immersed in the heat medium liquid 17 within the liquid storage tank 19. A lower end 125 of the inner tube 21 is preferably positioned at a depth of about 1 to 2 m from a land surface 126. The heat medium liquid 17 is a medium which transfers a thermal energy, and normally employs water, however, may employ mixture of antifreeze liquid with the water in a cold district.

Further, an upper end 23 of the outer tube 10 and an upper end 24 of the inner tube 21 are connected to one tube portion 27 and the other tube portion 29 of a heat absorbing and radiating tube portion 26 via connection tube portions 30 and 31 as shown in FIGS. 1A and 1B. The heat absorbing and radiating tube portion 26 can radiate heat in an area where heat radiation is required, and can absorb heat in an area (hereinafter, refer to as a heat absorbing and radiating area) 25 where heat absorption is required. In FIGS. 1A and 1B, the upper end 24 is connected to the one tube portion 27 and the upper end 23 is connected to the other tube portion 29. As a result, a pipe line 32 in which the heat medium liquid 17 flows is constructed. Further, at a desired position of the pie line 32, a pump 33 for circulating the heat medium liquid 17 within the pipe line 32 is arranged at desired positions of the connection tube portions 30 and 31. Further, a selector valve (not shown) is provided in the pipe line 32 for switching an operation of the underground heat exchanger 1 in the summer season and the winter season.

In the present invention, the heat absorbing and radiating area 25 means various areas requiring the heat absorption and radiation, for example, an inner portion of various buildings such as a house, a factory and a station building, a surface of each paved portion such as a parking space, an open road and a bridge, and a surface of a paved portion of a railroad station vicinity and a tunnel.

Figure 4A:
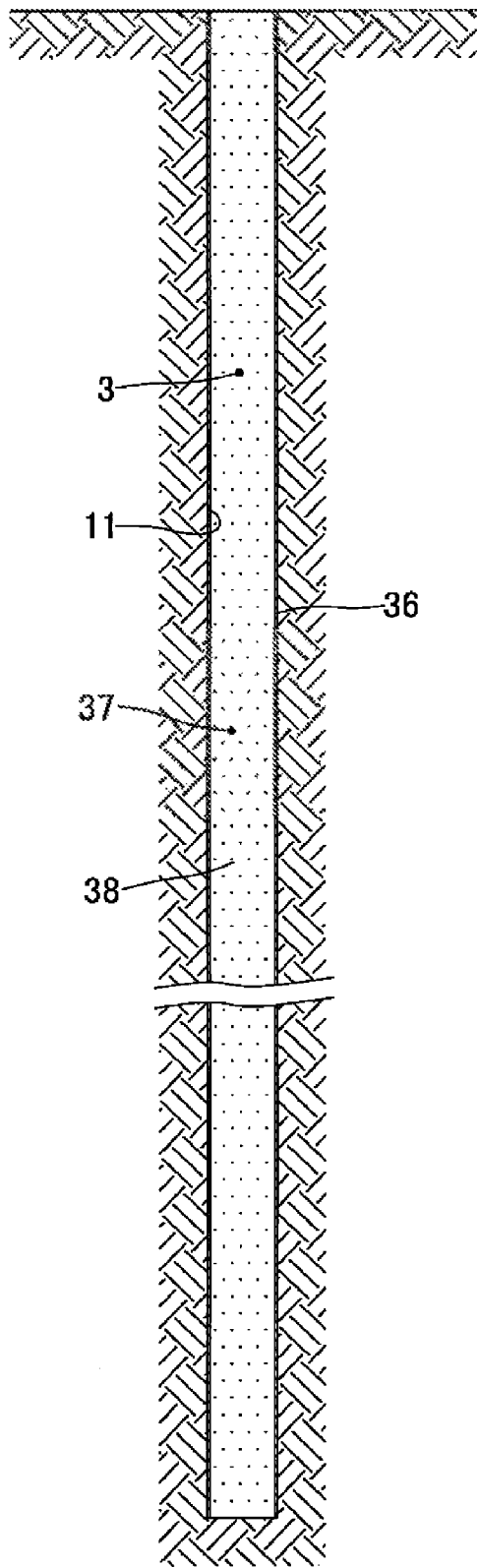
FIGS. 4A and 4B are vertical cross sectional views showing a hole portion formed by covering the inner wall portion of the accommodation hole portion provided on the ground in a vertical direction with a cylindrical casing.
Figure 4B:
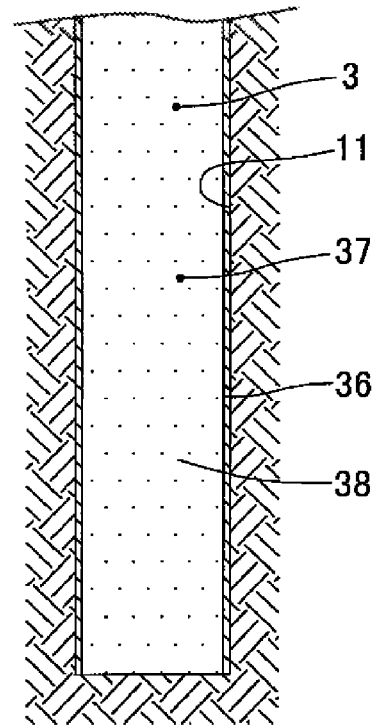

The accommodation hole portion 3 is provided, for example, excavating the ground 2 serving as a sedimentary layer to a desired depth, and is set, for example, to about 165 mm in its hole diameter and about 10 to 100 m in its depth. In the present embodiment, the ground is excavated to the desired depth together with a cylindrical casing while supplying water in a state in which an excavation bit is expanded its diameter according to the usual manner. FIGS. 4A and 4B show a hole portion 37 which is formed by coating the inner wall portion 11 of the accommodation hole portion 3 formed by the excavation bit and having a length, for example, of about 50 m with a cylindrical casing 36. The cylindrical casing 36 protects the inner wall portion 11 of the accommodation hole portion 3 formed by the excavation, and has an inner diameter of about 150 mm and an outer diameter of about 165 mm in the present embodiment. Further, since a length of one cylindrical casing 36 is between 1 and 3 m, for example, about 2 m, a desired number of the cylindrical casings 36 are welded or screw bonded to each other in their end portions so as to be elongated. The hole portion 37 is filled with the water, however, bentonite is blended in the filled water at this time point, in the present embodiment. The water blended with the bentonite is hereinafter called as a bentonite blending solution 38.

Figure 5:
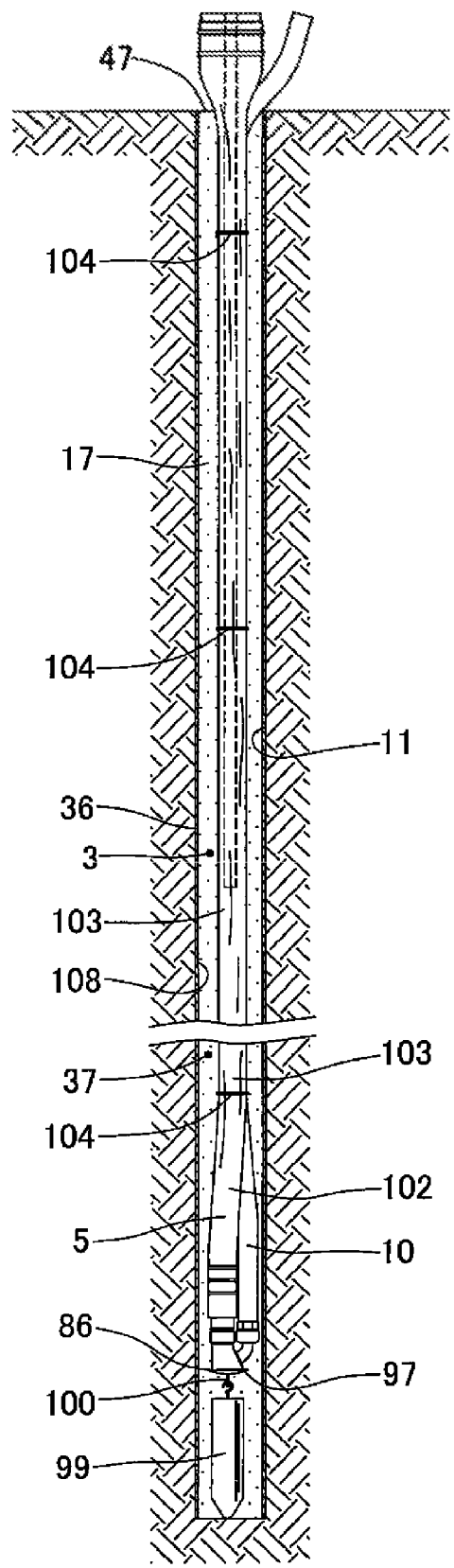
FIG. 5 is a vertical cross sectional view showing a state in which an accommodation material constructed by the bag body, the outer tube and a weight is accommodated in the hole portion.

An inner diameter of the hole portion 37 formed as mentioned above is about 150 mm in the present embodiment, and an accommodated object 102 mentioned later is desirably accommodated therein as shown in FIG. 5. After the accommodated object 102 is accommodated in the hole portion 37, the cylindrical casing 36 is sequentially pulled up and removed as shown in FIGS. 6A and 6B. When pulling up, the bentonite protects the inner wall portion 11 so as to prevent the inner wall portion 11 of the accommodation hole portion 3 from collapsing as much as possible. The inner wall portion 11 of the accommodation hole portion 3 formed by the excavation as mentioned above is formed into a concavo-convex surface shape, for example, as shown in FIG. 6B. The inner wall portion 11 is shown as a smooth surface shape as a matter of convenience in the other drawings than FIGS. 6B, 22B and 23B.

Figure 7:
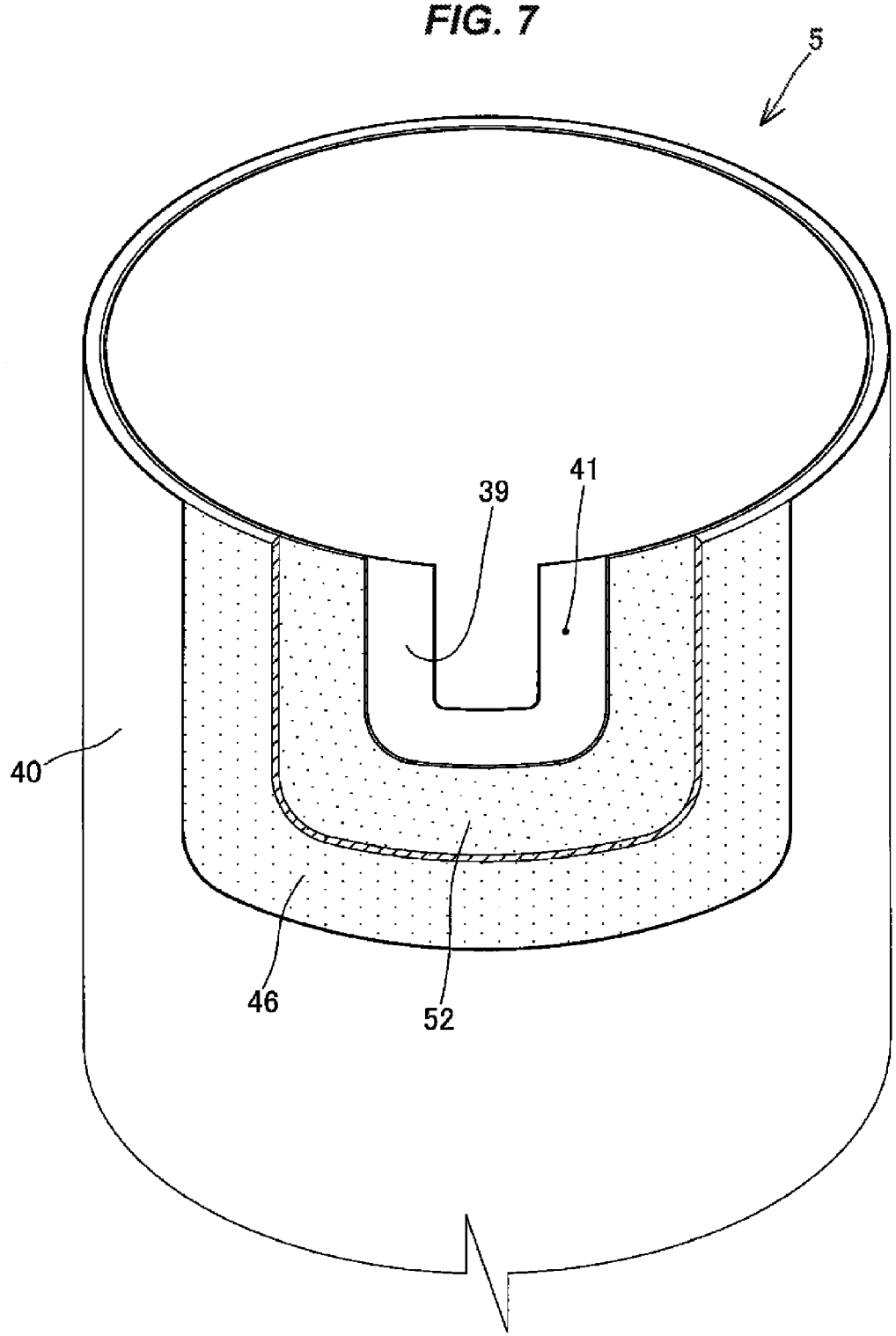
FIG. 7 is a partly cut perspective view describing the bag body.
Figure 8A:
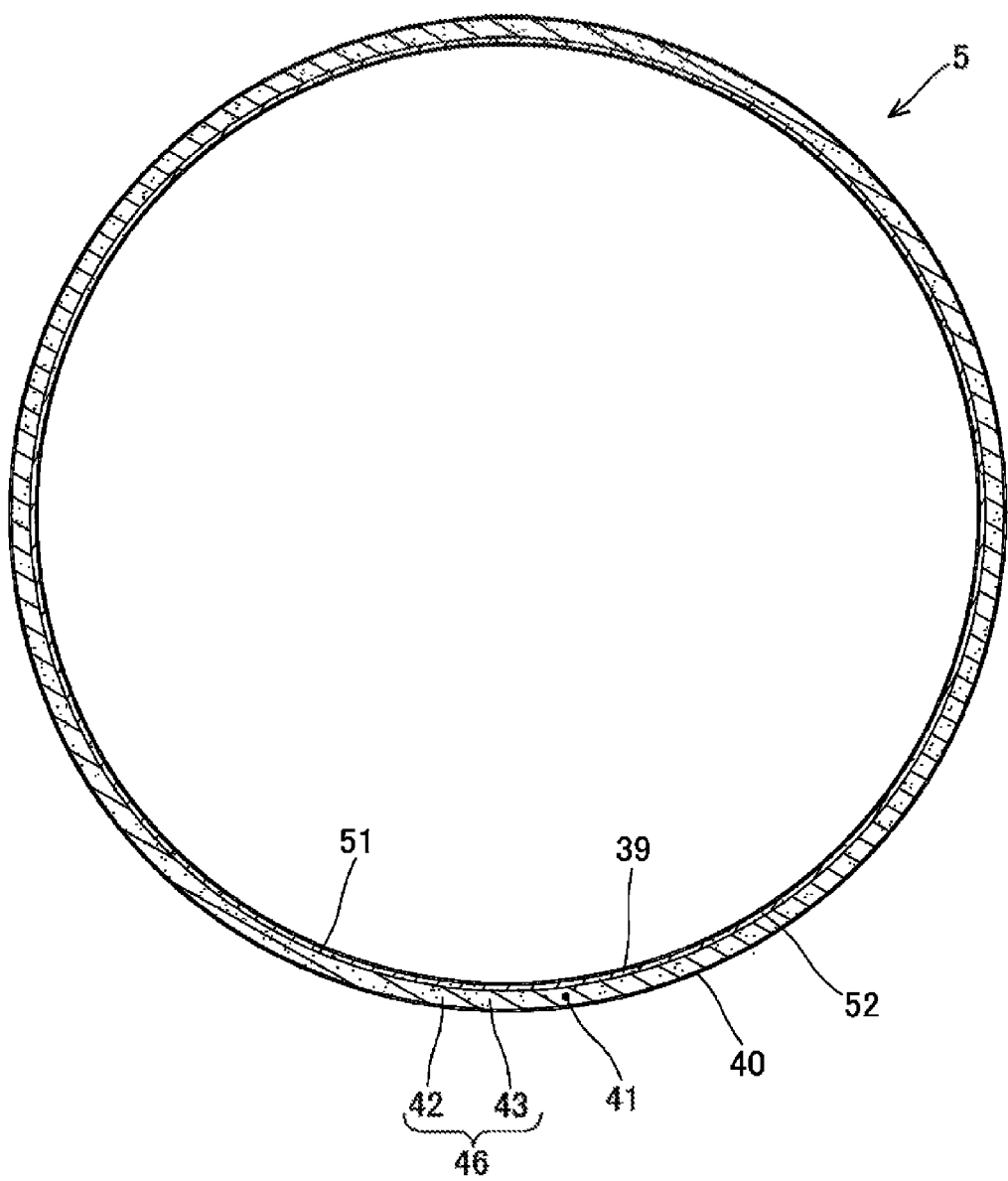
FIGS. 8A and 8B are transverse cross sectional views of the same.
Figure 8B:
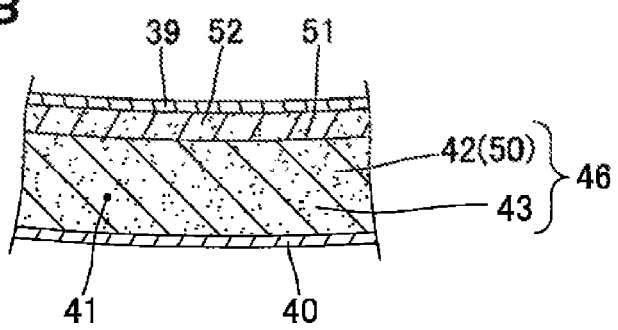

The bag body 5 is formed into a bottomed tubular shape in which a core member 46 obtained by impregnating a flexible annular base member 42 with a liquid hardening resin 43 is accommodated in the annular gap 41 which is formed between a flexible inner bag 39 made of resin and a flexible outer bag 40 made of resin, as shown in FIGS. 7, 8A and 8B in the present embodiment. The flexible annular base member 41 is formed into an annular shape along a circumferential direction of the annular gap 41. The flexible inner bag 39 and the flexible outer bag 40 prevent the liquid hardening resin from leaking. The bag body 5 is accommodated in the accommodation hole portion 3 and extends in the vertical direction as mentioned above. The outer surface portion 6 of the bag body 5 can cover the inner wall portion 11 having the concavo-convex surface shape in the accommodation hole portion 3 in a closely contact state, as shown in FIG. 3, in a state in which the bag body 5 is inflated. As a result, the flexible outer bag 40 is constructed by a resin raw material which can elongate at a certain degree and is excellent in strength, for preventing the flexible outer bag 40 from rubbing with the inner wall portion 11 having the concavo-convex surface shape and breaking. In the process of inflating the bag body 5 accommodated within the accommodation hole portion 3 so as to extend in the vertical direction as mentioned later, the bentonite blending solution 38 within the accommodation hole portion 3 is discharged from an upper end 47 of the accommodation hole portion 3 as shown by an arrow F1 in FIGS. 22A and 22B. Further, since the liquid hardening resin 43 (FIGS. 8A and 8B) is hardened in a state in which the inner wall portion 11 is covered in the closely contact state as mentioned above, the lining tubular body 15 extending in the vertical direction is formed as shown in FIG. 1B. The lining tubular body 15 forms a liquid storage tank 19 for storing the heat medium liquid 17 as mentioned above. The thickness of the lining tubular body 15 is set to be about 2 to 4 mm, for example, set to be about 3.5 mm, with taking into consideration the strength for the liquid storage tank 19.

In the present embodiment, as shown in FIG. 3, the outer surface portion 6 of the bag body 5 can securely cover the inner wall portion 11 having the concavo-convex surface shape of the accommodation hole portion 3 in the closely contact state, and the desired with portion 12 can cover a desired width portion 48 of an outer surface portion 44 in the outer tube 10 in a bending state. As a result, an outer diameter of the bag body 5 in an cylindrically inflating state (FIGS. 7, 8A and 8B) is set to be somewhat greater than the hole diameter 165 mm. For example, the outer diameter is set to be about 185 mm.

The flexible inner bag 39 and the flexible outer bag 40 have the flexibility as mentioned above, have a fixed strength, have a heat resistance resisting the temperature when thermally hardening the liquid hardening resin, and have a great coefficient of thermal conductivity. For example, they are made of a thin resin raw material such as vinyl having a thickness of about 0.1 to 1 mm.

The flexible annular base member 42 is provided for making the liquid hardening resin 43 to be hardened stay in the annular gap 41 and be hard to drop, in a state in which the bag body 5 is accommodated in the accommodation hole portion 3 in a state of setting a length direction thereof to the vertical direction, and is constructed by a raw material having a high coefficient of thermal conductivity. The flexible annular base member 42 is constructed by a warp knitted tube member 50 which is high in the coefficient of thermal conductivity and excellent in the strength and employs a comparatively expensive glass fiber, in the present embodiment, and is arranged in the annular gap 41 in a state in which an extending direction of a weft of the warp knitted tube member 50 is aligned with the circumferential direction of the annular gap 41 and an extending direction of a warp of the warp knitted tube member 50 is aligned with the extending direction of the bag body 5.

Accordingly, the warp knitted tube member 50 is formed into an endless tubular shape in the circumferential direction in a state of being arranged in the annular gap 41, has an excellent tensile strength in the extending direction (the vertical direction as well as having a stretching property in the circumferential direction (the horizontal direction), and is excellent in flexibility.

Figure 9:
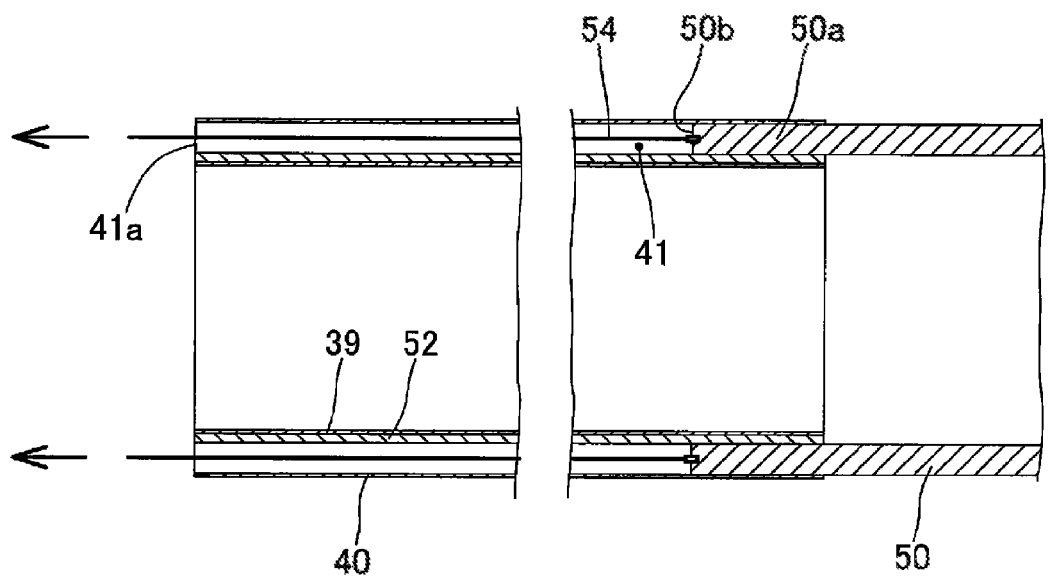
FIG. 9 is an explanatory view describing an example of a way for arranging a warp knitted tube member in an annular gap which is formed between a flexible inner bag and a flexible outer bag.
Figure 10:
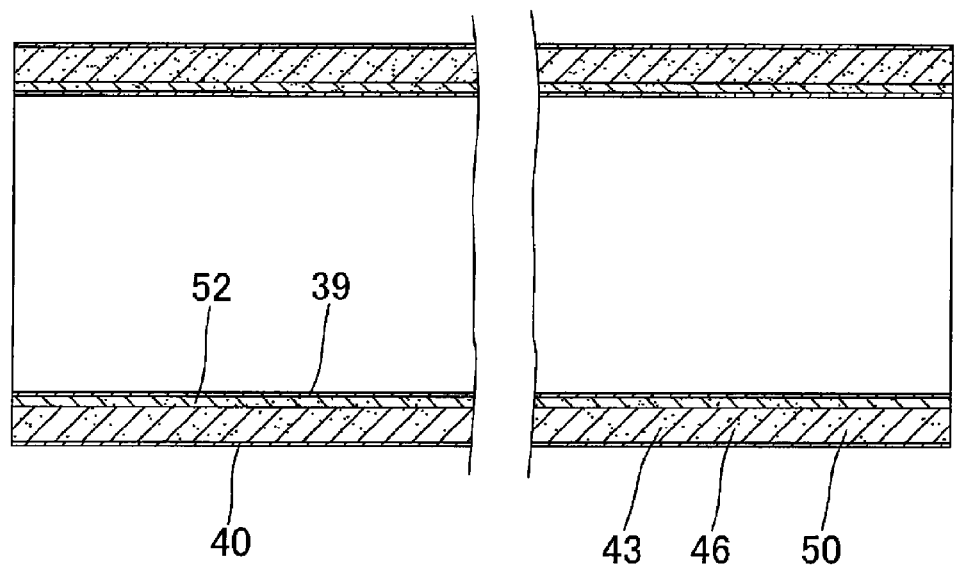
FIG. 10 is an explanatory view describing a state in which a core member is accommodated in the annular gap.

The endless tubular shape can be formed, for example, by sewing both side portions as seen from a width direction of the planate warp knitted piece each other. It is possible to arrange the warp knitted tube member 50 formed into the tubular shape in the annular gap 41 by inserting one end portion 50*a* of the warp knitted tube member 50 into one end side portion of the annular gap 41 formed between the flexible inner bag 39 and the flexible outer bag 40 and thereafter pulling one end 50*b* of the warp knitted tube member 50 from the other end 41*a* of the annular gap 41 toward the other end 41*a* via a string-like member 54, for example, as shown by a schematic illustration in FIG. 9. The core member 46 can be constructed by arranging the warp knitted tube member 50 in the annular gap 41 as mentioned above, and thereafter impregnating the warp knitted tube member 50 with the liquid hardening resin 43 as shown by a schematic illustration in FIG. 10. The impregnation can be achieved by supplying the liquid hardening resin 43 into the annular gap 41 from one end side or both end sides thereof. A thickness of the core member 46 is set, for example, about 3 mm.

Various kinds of resins can be used as the thermosetting liquid hardening resin 43. For example, a material obtained by adding a thermosetting hardening agent to a comparatively inexpensive unsaturated polyester resin. As the hardening agent, there can be listed up, for example, polyfunctional amine, polyamide, and phenol resin, however, the hardening agent is not limited to them. In order to further prevent the liquid hardening resin 43 impregnated in the flexible annular base member 42 (FIG. 8A) from dropping, an appropriate amount of thickening agent may be mixed thereto. In the present embodiment, for example, a hardening agent hardening at a temperature of about 80° C. is employed as the thermosetting hardening agent. It is possible to improve the coefficient of thermal conductivity of the liquid hardening resin by mixing an appropriate amount (for example, 10 to 40% in ratio by weight) of silicon carbide to the unsaturated polyester resin. Therefore, it is possible to more effectively utilize the underground heat by improving the coefficient of thermal conductivity of the lining tubular body 15.

The warp knitted tube member 50 (FIG. 8B) constructing the core member 46 plays a role to retain the liquid hardening resin 43 as mentioned above, and intends to increase strength of the lining tubular body 15 after the lining tubular body 15 is constructed by hardening the liquid hardening resin 43.

According to the bag body 5 having the structure mentioned above, the warp knitted tube member 50 has the stretching property in the circumferential direction (the horizontal direction) and is excellent in the flexibility. As a result, the outer surface portion 6 of the bag body 5 tends to cover in the closely contact state the inner wall portion 11 of the accommodation hole portion 3 while going along the concavo-convex portion 11*a* (FIG. 6B) of the inner wall portion 11 forming the concavo-convex surface shape in the accommodation hole portion 3, for example, as shown in FIG. 3. Further, since the warp knitted tube member 50 has the excellent tensile strength in the extending direction (the vertical direction) thereof, it is possible to suppress the elongation of the bag body 5 in the vertical direction as much as possible when accommodating the bag body 5 within the accommodation hole portion 3.

Figure 23A:
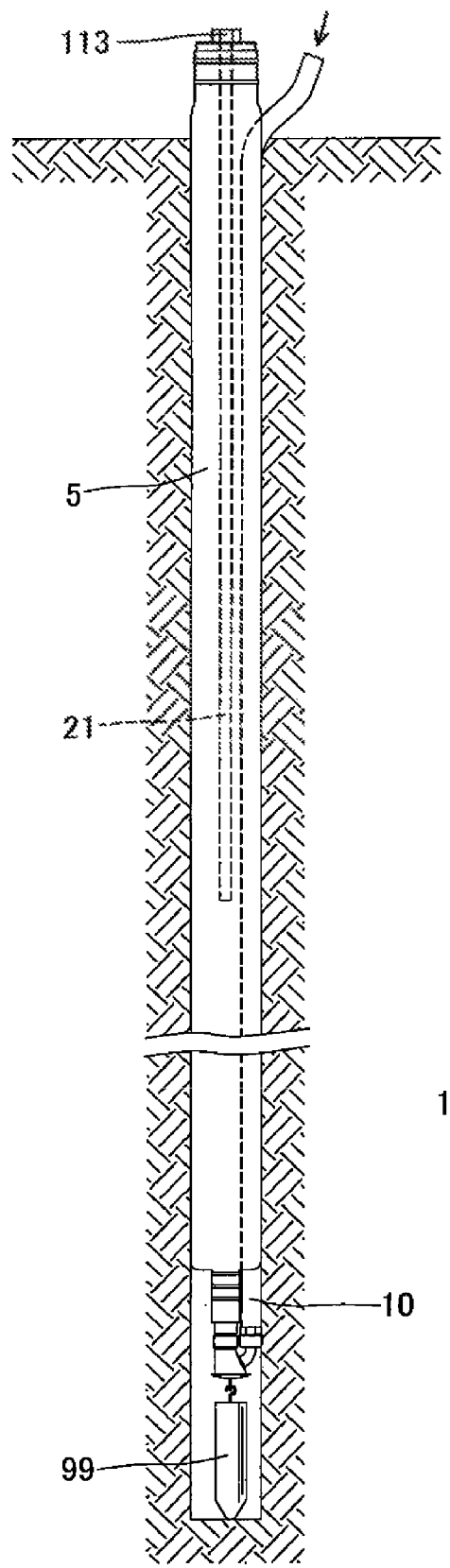
FIGS. 23A and 23B are explanatory views of a partial cross section showing a state of further inflating the bag body in a state in which the plug body is attached to the lid member.
Figure 23B:
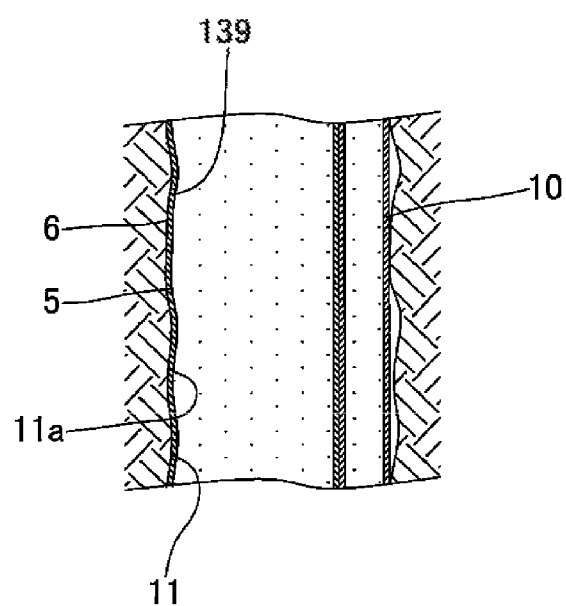

In the bag body 5, the warp knitted tube member 50 having the structure mentioned above is a constituent element of the core member 46 as shown in FIGS. 8A and 8B. As a result, it is possible to effortlessly cover the inner wall portion 11 of the accommodation hole portion 3 on the basis of the stretching property in the circumferential direction (the horizontal direction) and easily bring into close contact with the inner wall portion 11, as shown in FIG. 23B.

Since the flexible outer bag 40 constructing the liquid storage tank 19 having the structure mentioned above is in the closely contact state with the inner wall portion 11 as shown in FIG. 3, the flexible outer bag 40 is safe from peeling off. However, the flexible inner bag 39 is at risk of peeling from the inner peripheral surface 51 (FIGS. 8A and 8B) of the hardened core member 46 due to the aged deterioration since the inner peripheral surface of the flexible inner bag 38 is in a free state. In the case that the peeling portion is broken, the heat medium liquid piles up between the peeling film portion and the core member 46. As a result, the movement of the heat medium liquid 17 within the liquid storage tank 19 is inhibited.

Accordingly, in the present embodiment, in order to more improve an integration strength of the flexible inner bag 39 and the core member 46, an inner surface of the flexible inner bag 39 in the flexible outer bag 40 side opposed to the flexible inner bag 39 is covered with a felt (for example, having a thickness of about 1 mm) 52, and the felt 52 is thermally deposited to the flexible inner bag 39 like a spot, for example, at an interval of about 10 cm, for example, as shown in FIGS. 7, 8A and 8B. Therefore, the felt 52 is impregnated with the liquid hardening resin 43 of the core member 46, and the flexible inner bag 39 is integrated with the hardened core member 46 via the felt 52 by hardening the liquid hardening resin 43. As a result, it is possible to prevent the peeling of the flexible inner bag 39 as mentioned above.

Figure 11A:
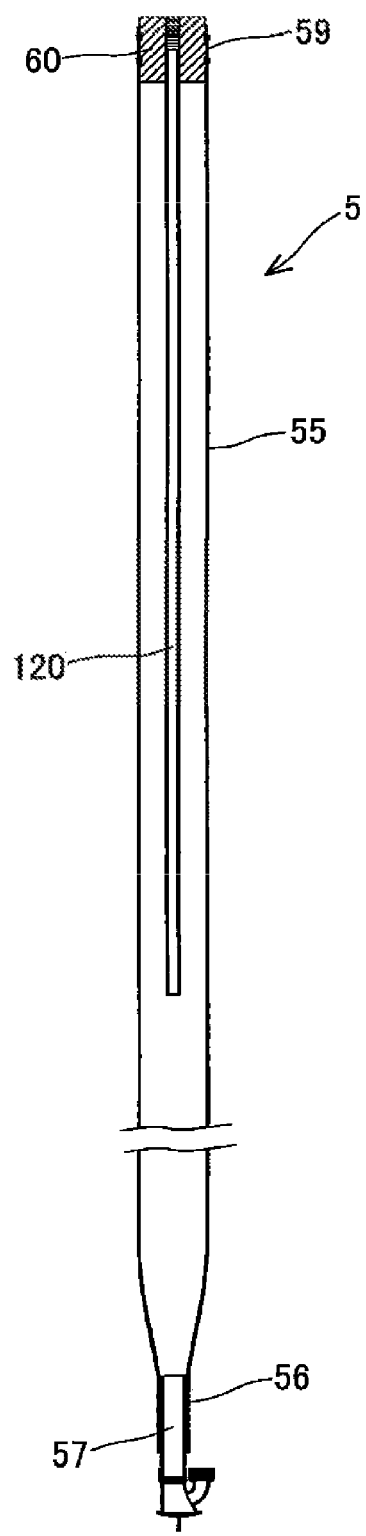
FIGS. 11A to 11C are vertical cross sectional views showing a state in which a bottom member is joined to a lower end tube portion of a flexible tubular member having open upper and lower ends in the bag body, and a lid member is joined to an upper end tube portion thereof.
Figure 11B:
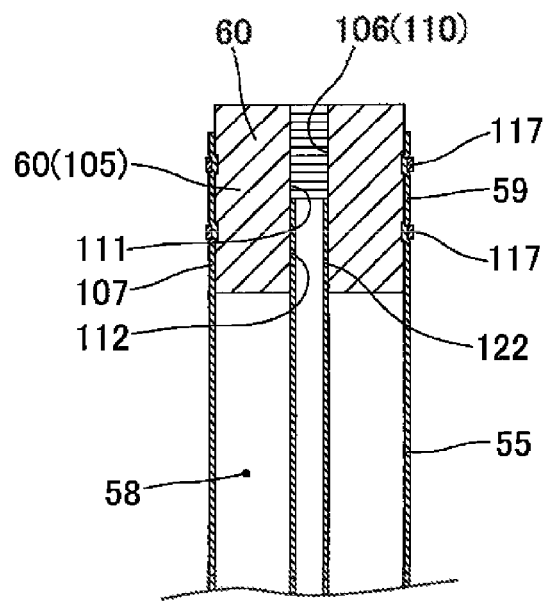
Figure 11C:
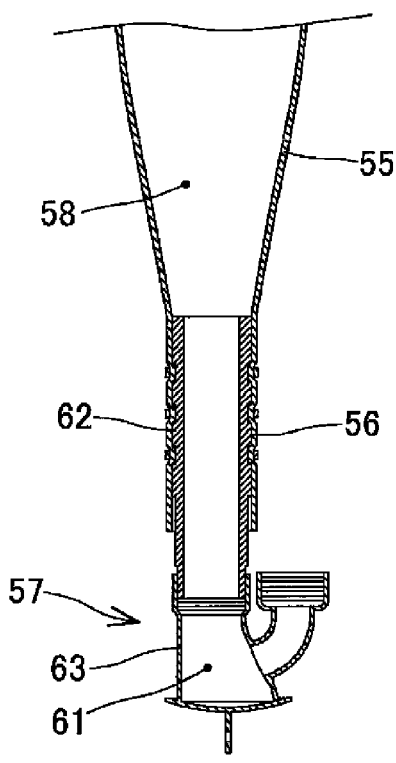

In a specific structure of the bag body 5 having the bottomed tubular shape, a bottom member 57 is bonded to a lower end tube portion 56 of a flexible tubular member (which is structured such that the tubular core member 46 is arranged between the flexible inner bag 38 having open upper and lower ends and the flexible outer bag 40) 55 formed into a tubular shape which is open in upper and lower ends, and a lid member 60 is bonded to an upper end tube portion 59 of the flexible tubular member 55, as shown in FIGS. 11A to 11C.

Figure 12:
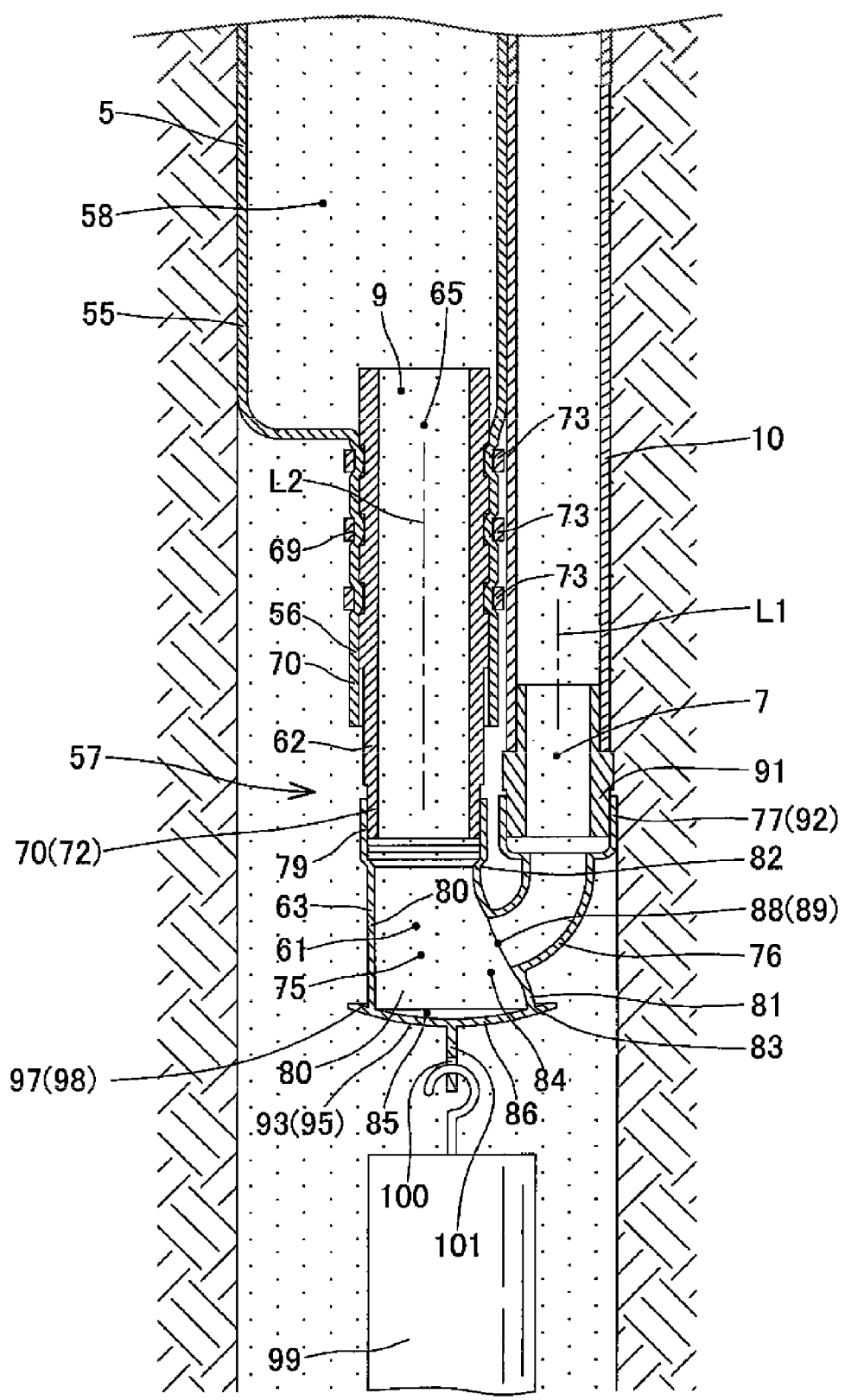
FIG. 12 is a vertical cross sectional view describing a bottom member.
Figure 13:
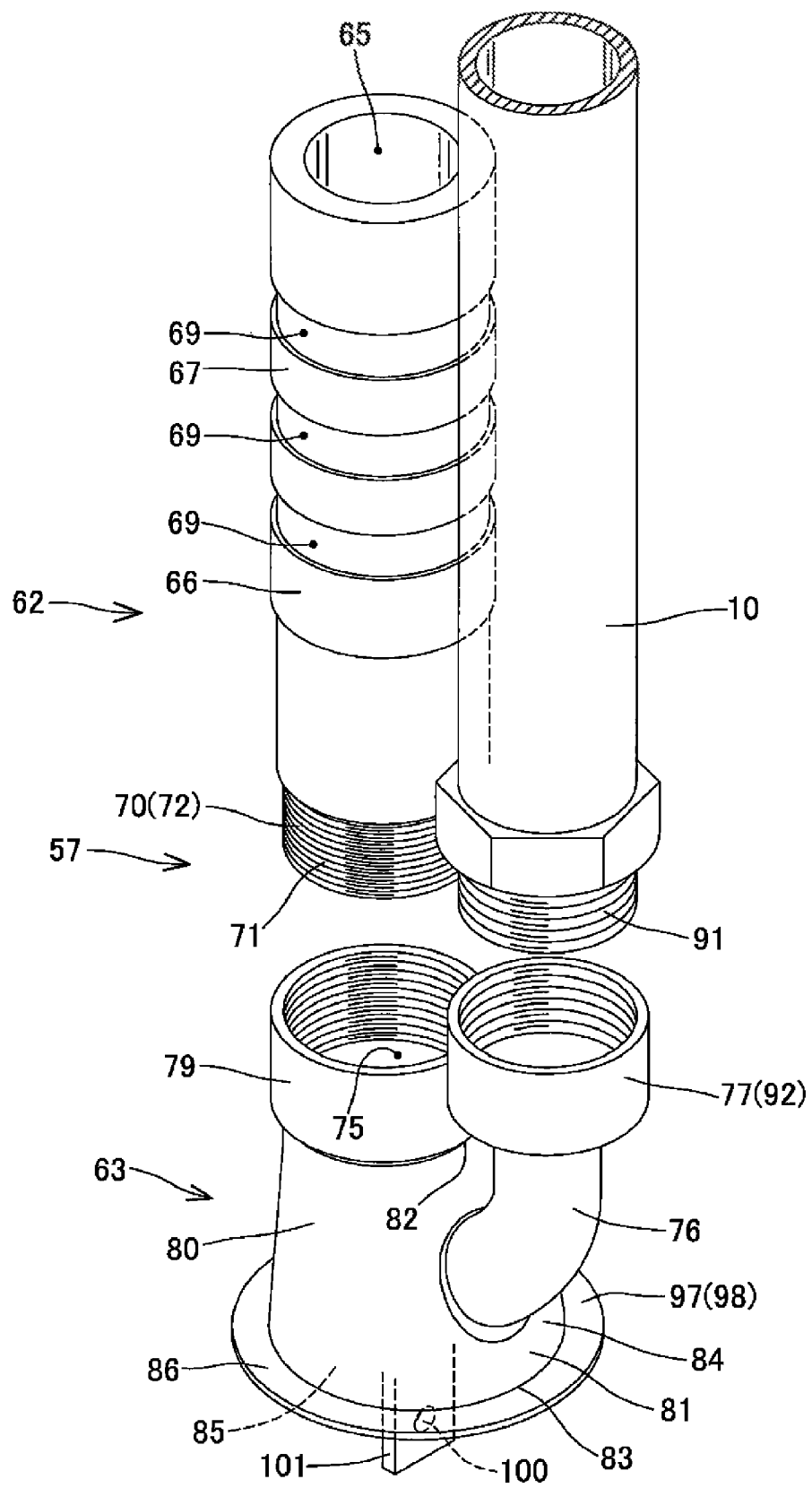
FIG. 13 is a perspective view describing the bottom member and a lower end portion of the outer tube.
Figure 14:
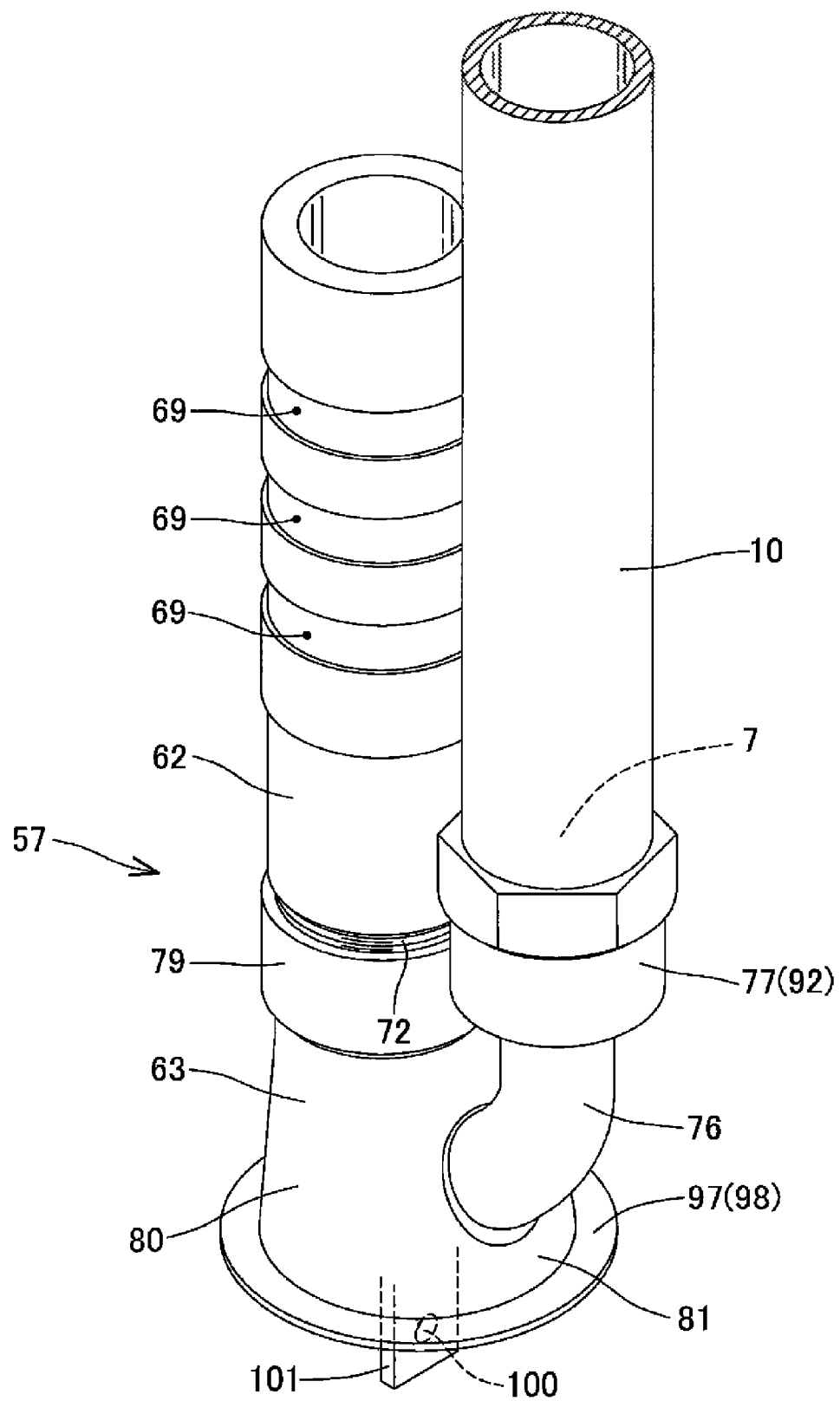
FIG. 14 is a perspective view showing a state in which the lower end of the outer tube is communicated with the bottom member.

The bottom member 57 has a concave portion 61 which communicates with an internal space 58 of the flexible tubular member 55, and a lower end 7 of the outer tube 10 communicates with the concave portion 61 as shown in FIG. 12. The bottom member 57 is constituted by an upper member 62 and a lower member 63 more specifically as shown in FIGS. 12 and 13 to 14. The upper member 62 is formed into a cylindrical shape made of a synthetic resin, an inner diameter thereof is set to be about 30 mm, an outer diameter thereof is set to be about 60 mm, and a communication hole 65 which is open in upper and lower ends is provided. Further, three fixing peripheral grooves 69 are provided in each of upper and lower sides of an upper portion 67 of the outer peripheral portion 66 at intervals, and a lower end tube 70 thereof is formed as a male thread tube portion 72 which is provided with a male thread portion 71 in the outer peripheral portion 66, as shown in FIG. 13. The upper member 62 is inserted into the lower end tube portion 70 of the flexible tubular member 55 as shown in FIG. 12, and is connected to the lower end tube portion 70 by being fastened in the fixing peripheral grooves 69, 69 and 69 by a band member 73 which is wound to the lower end tube portion 70.

Further, the lower member 63 is provided with a bottomed hole portion 75 which can, communicate with the communication hole 65 as shown in FIGS. 12 and 13 to 14, and is provided with a communication tube 76 for communicating with the bottomed hole portion 75. Further, as shown in FIG. 12, an upward protruding connection tube portion 77 provided in the communication tube 76 is connected to the lower end 7 of the outer tube 10. Further, the lower member 63 is made of, for example, stainless steel in the present embodiment, and has a cylindrical portion 80 which can be threadably engaged with the male thread tube portion 72 and is formed into a female thread tube portion 79 having an inner diameter of about 30 mm, in its upper portion, as shown in FIGS. 12 and 13. One side portion 81 of the cylindrical portion 80 is formed into an expanded portion 84 which is expanded its diameter from an upper end 82 thereof toward a lower end 83, and a lower end open portion 85 of the expanded portion 84 is closed by a bottom plate portion 86. Further, as shown in FIG. 12, the lower end 89 of the communication tube 76 protruding upward is connected to a communication port 88 which is provided at an intermediate height position of the expanded portion 84, and the connection tube 77 of the communication tube portion 76 is formed as a female thread tube portion 92 (the connection tube portion 77) which can be threadably engaged with a connection male thread tube portion 91 provided in a lower end portion of the outer tube 10. FIG. 12 shows a state in which the outer tube 10 communicates with the lower end 9 of the bag body 5 by threadably engaging and fastening the connection male thread tube portion 91 with and to the connection female thread tube portion 91, and the outer tube 10 is provided in a rising manner in the extending direction (the vertical direction) of the bag body 5.

Further, the lower surface 93 of the bottom plate portion 86 is formed as a circular arc surface 95 which is convex downward, as shown in FIG. 12, and an outer peripheral edge portion of the bottom plate portion 86 is formed as a collar portion 97 which protrudes to an outer side of a peripheral edge of the lower end open portion 85 (FIG. 12). The collar portion 97 constructs an expanded protection portion 98 which protrudes to an outer side of an outer peripheral surface of the upper member 62, a locking piece 101 having a locking hole 100 provided for suspending a weight 99 is arranged in a protruding manner in the center portion of the lower surface 93, and the locking hole 100 somewhat displaces to an axis L1 side of the outer tube 10 in relation to an axis L2 of the upper member 62. The weight 99 is structured, for example, such that a diameter is about 80 mm, a length is about 300 mm and a weight is about 30 kg.

Further, the upper member 62 and the lower member 63 are connected and integrated by threadably engaging and fastening the male thread tube portion 72 with and to the female thread tube portion 70, as shown in FIGS. 12 and 14, so that the bottom member 57 is constructed.

Figure 15:
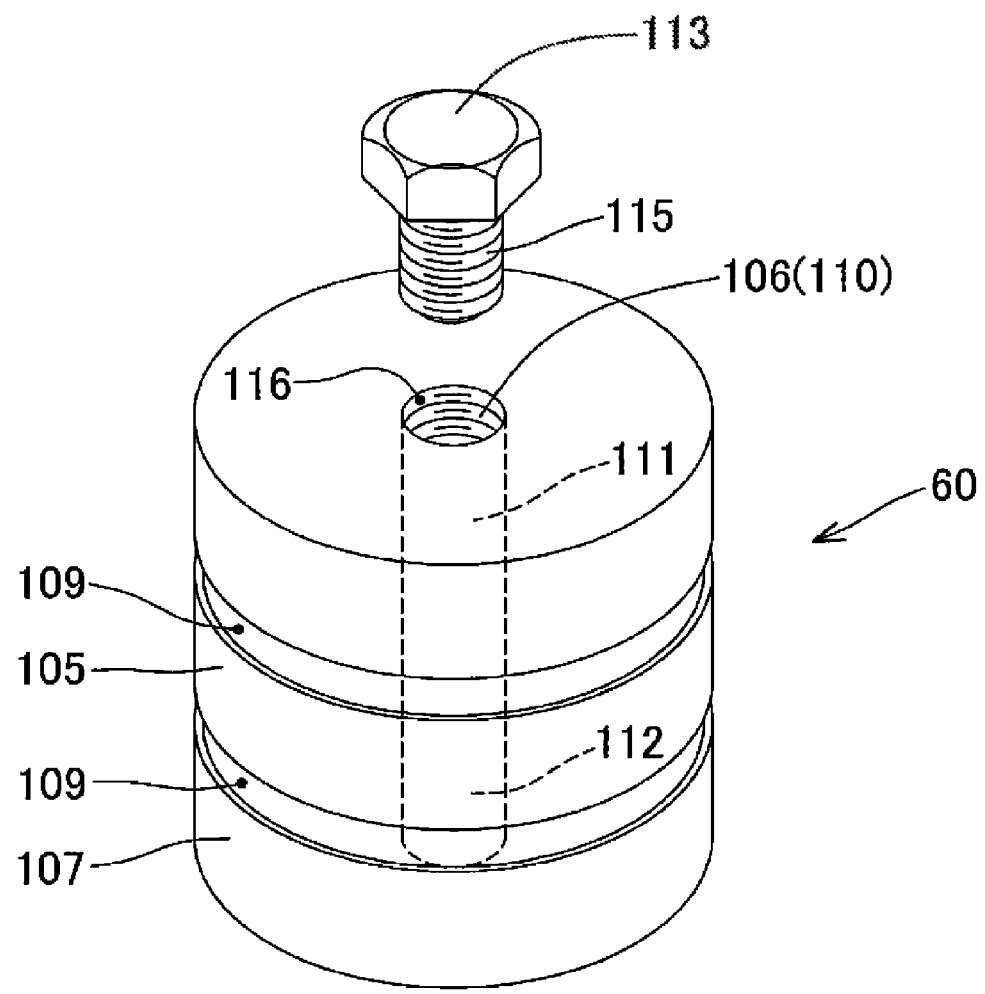
FIG. 15 is a perspective view showing the lid member in a state in which a plug body is detached.
Figure 16:
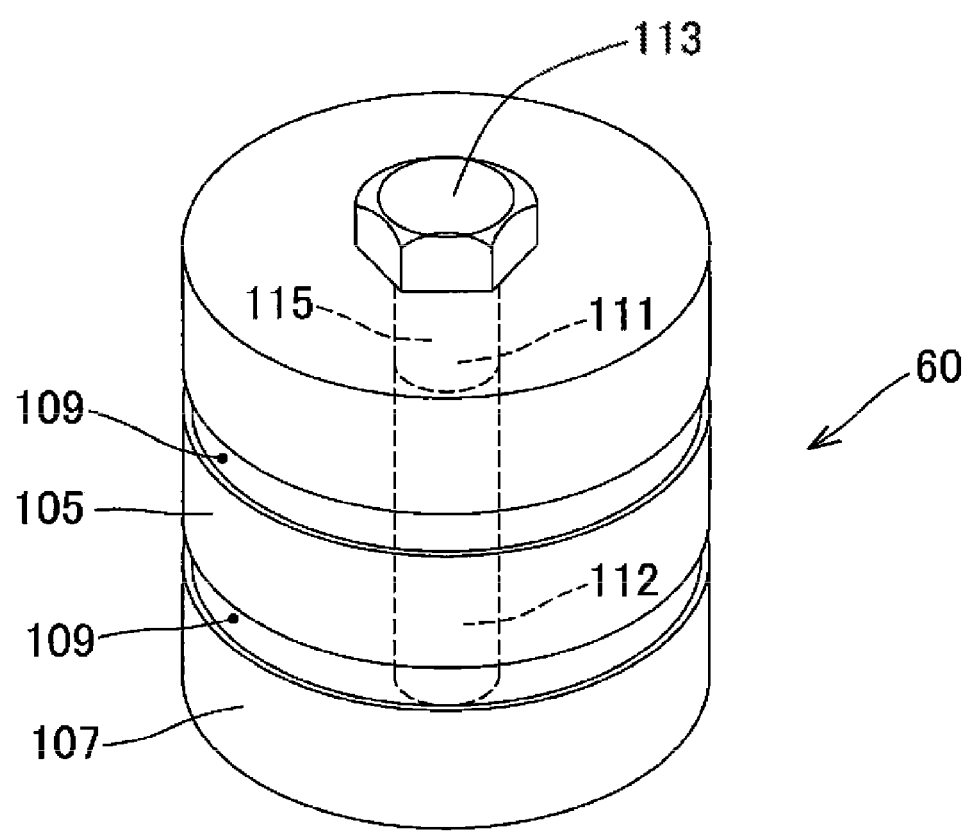
FIG. 16 is a perspective view showing a state in which the plug body is attached to the lid member.

The lid member 60 is constructed by using a columnar member 105 which is provided in a penetrating manner with a circular through hole 106 along a center axis and is made, of a synthetic resin, as shown in FIGS. 11A to 11C and 15 to 16. An outer diameter of the columnar member 105 is set to be about 150 mm, and is provided with the through hole 106 having an inner diameter of about 30 mm, and fixing groove portions 109 and 109 continuing in the circumferential direction are provided in upper and lower sides of the outer peripheral portion 107, as shown in FIGS. 15 and 16.

The through hole 106 is formed as a thread hole 110, and an upper thread hole 111 corresponding to an upper portion thereof and a lower thread hole 112 corresponding to a lower side portion thereof are formed as revere thread holes. Further, as shown in FIG. 16, in the upper thread hole 111 of the thread hole 110, an upper end open portion 116 of the through hole 106 is closed by threadably engaging and fastening a thread shaft portion 115 of a plug body 113.

Figure 17:
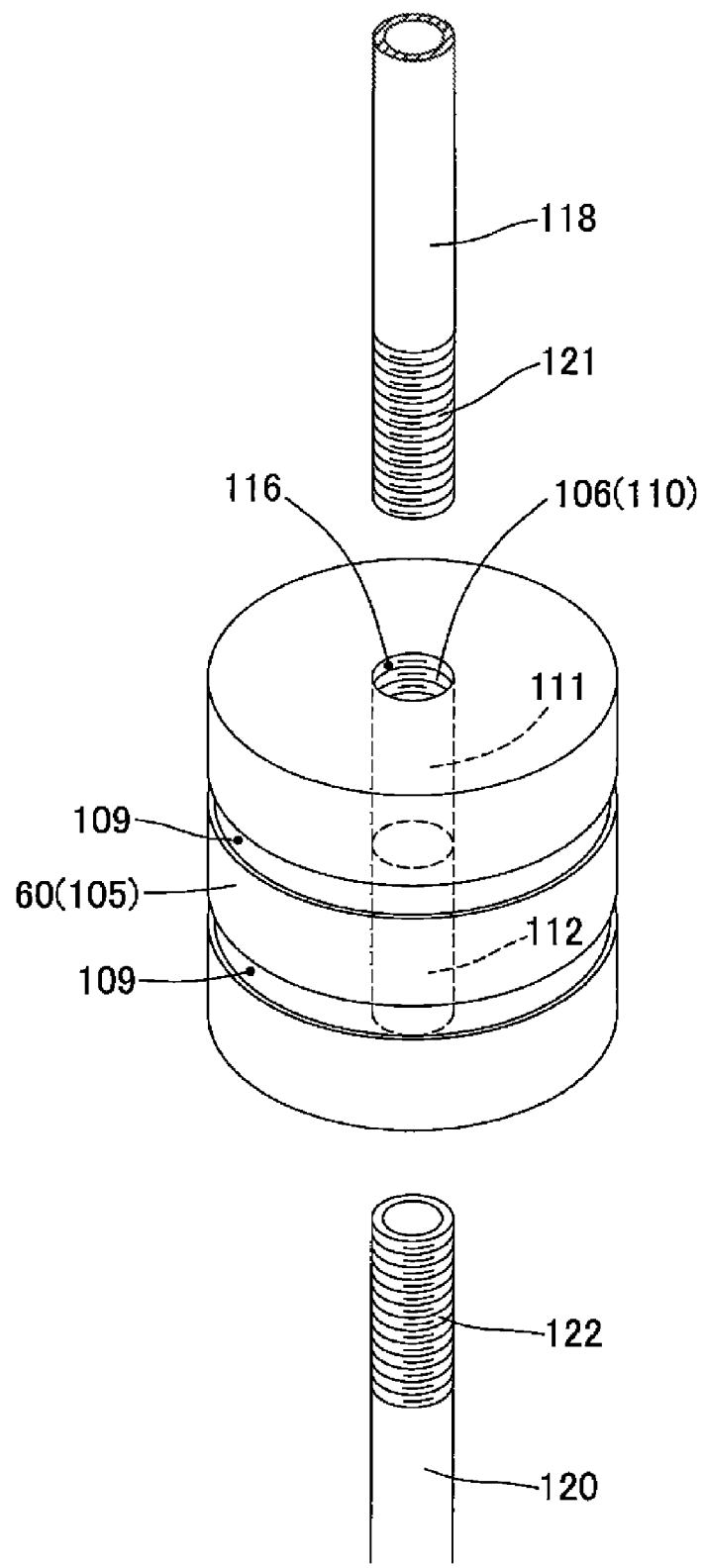
FIG. 17 is a perspective view showing the lid member, and an upper tube member and a lower tube member which are attached to the lid member according to a threadable engagement.
Figure 18:
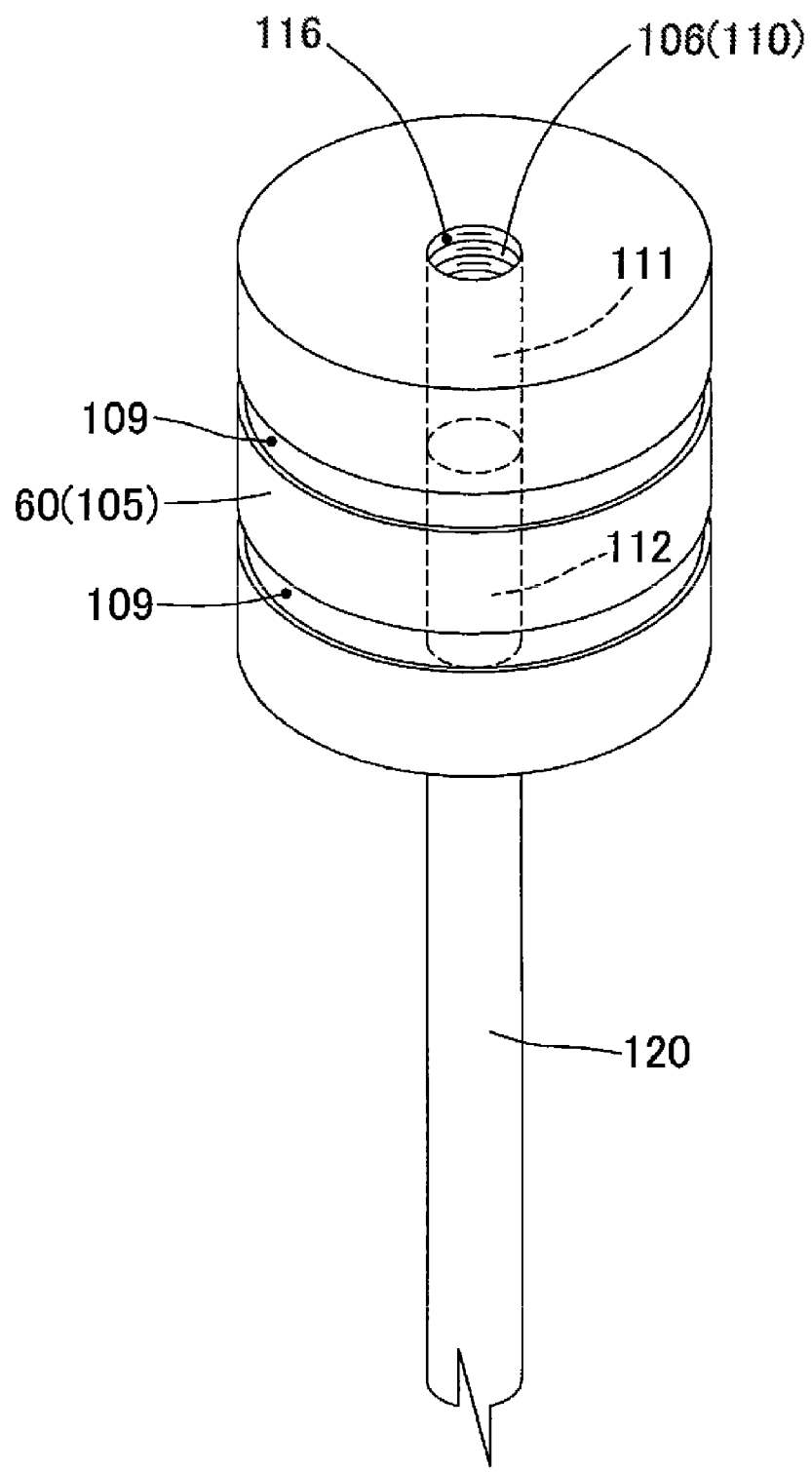
FIG. 18 is a perspective view showing a state in which the lower tube member is attached to the lid member.

The inner tube 21 is divided into two sections including an upper tube member 118 and a lower tube member 120 as shown in FIGS. 1A, 1B and 17 in the present embodiment, and the inner tube 21 (FIGS. 1A and 1B) is set to be in a state of being attached to the lid member 60, by threadably engaging a male thread piping portion 121 forming a lower portion of the upper tube member 118 with the upper thread hole 111, and threadably engaging a male thread piping portion 122 forming an upper portion of the lower tube member 120 with the lower thread hole 112. In the present embodiment, the lower tube member 120 is attached to the lid member 60 prior to the connection of the lid member 60 to the upper end tube portion 59 (FIG. 11A), as shown in FIG. 18. Thereafter, the lid member 60 to which the lower tube member 120 is attached is inserted into the upper end tube portion 59 as shown in FIGS. 11A and 11B, and is connected to the upper end tube portion 59 by being fastened in the fixing groove portions 109 and 109 (FIG. 16) by a band member 117 which is wound to the upper end tube portion 59.

Figure 19:
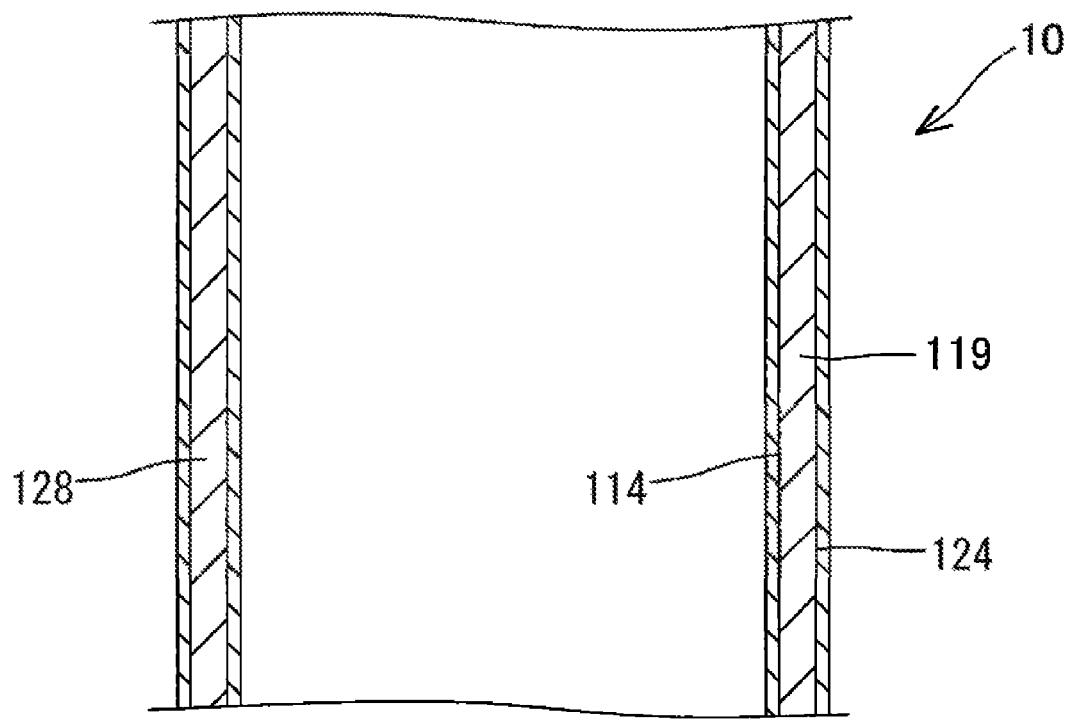
FIG. 19 is a cross sectional view describing an example of the outer tube.

The outer tube 10 employs an aluminum pipe 119 as a core tube, and is constructed by using a tube body 122 which is coated with, for example, a polyethylene resin in an inner surface 120 and an outer surface 121 thereof, as shown in FIG. 19 in the present embodiment. Further, an inner diameter of the outer tube 10 is about 40 mm and an outer diameter thereof is about 50 mm. Since the outer tube 10 is constructed by using the tube body 122 employing the aluminum pipe 119 as the core tube, the rigidity thereof is improved. Further, as shown in FIG. 13, the connection male thread tube portion 91 is provided in a lower end portion of the outer tube 10.

When constructing the liquid storage tank 19 for the underground heat exchanger 1, the accommodated object constituted by the weight 99, the bag body 5 and the outer tube 10 is taken down into the accommodation hole portion 3 (the hole portion 37 in the present embodiment) in a state in which the weight 99 is suspended in the locking hole 100, as shown in FIG. 5. In the present embodiment, since the locking hole 100 is somewhat deviated to the outer tube 10 side in relation to the axis L2 of the upper member 62 as shown in FIG. 12, it is possible to take the accommodation object 102 down into the accommodation hole portion 3 in a balanced manner so as to secure an approximately vertical state.

Figure 20:
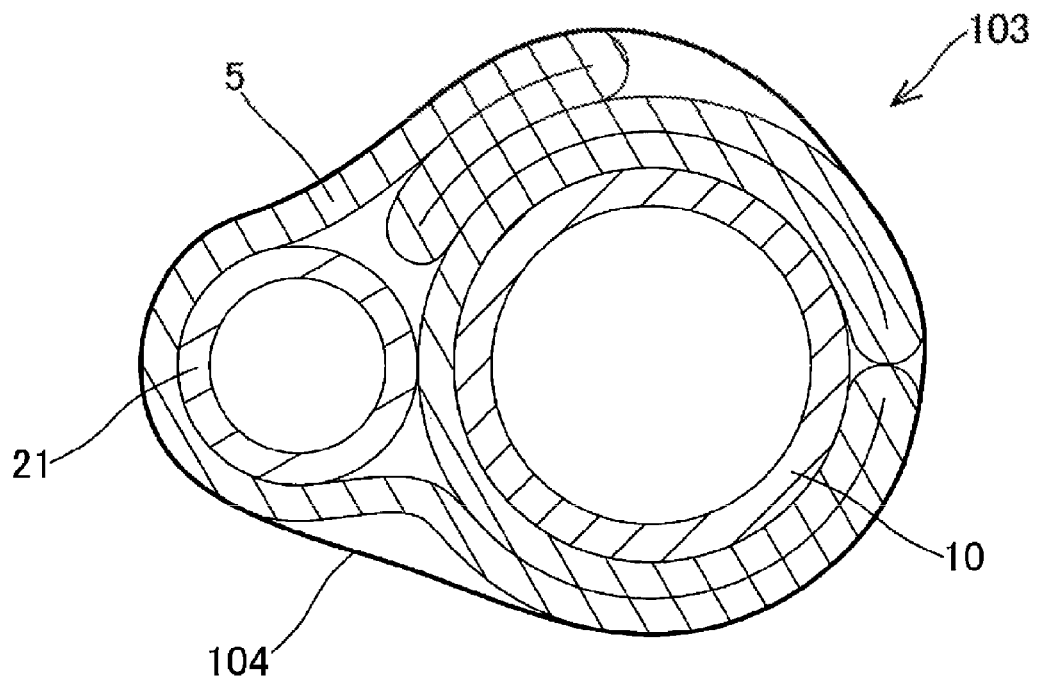
FIG. 20 is a cross sectional view showing a state in which the bag body is set to an enveloped state so as to envelop the lower tube member and the outer tube and the enveloped member is bound by a binding member.
Figure 21:
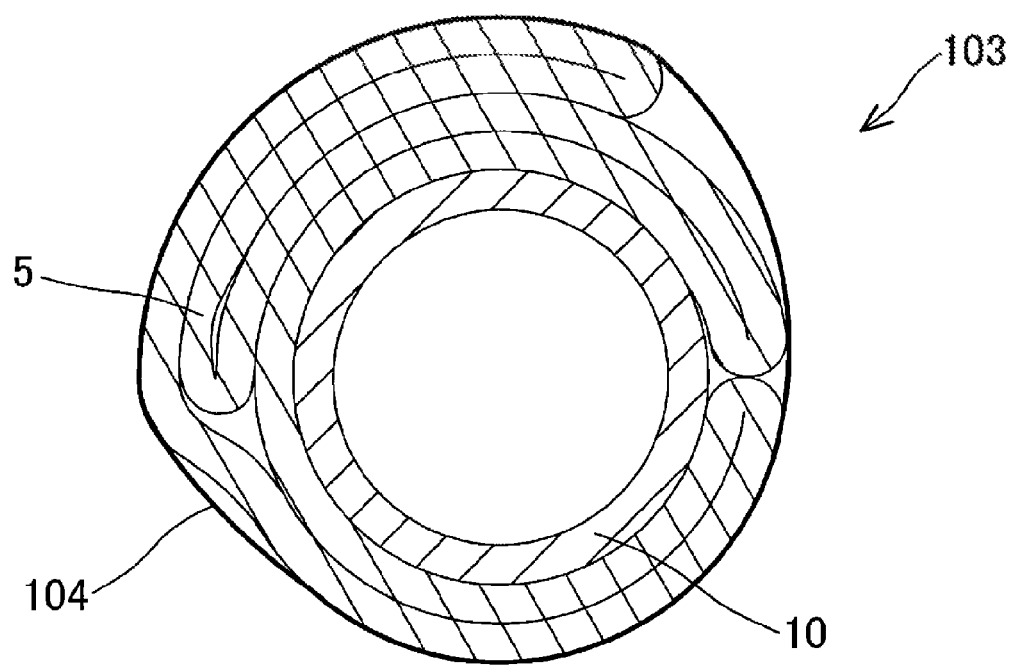
FIG. 21 is a cross sectional view showing a state in which the bag body is set to an enveloped state so as to envelop the outer tube and the enveloped member is bound by the binding member.

When taking down the accommodated object 102 into the accommodation hole portion 3, the bag body 5 is set to an enveloping state so as to envelop the outer tube 10, for example, as shown in FIGS. 20 and 21, while carrying the bag body 5 having a length of about 50 m and the outer tube 10 having a length of about 50 m which are wound to independent reels, in the construction field, and simultaneously rewinding the bag body 5 and the outer tube 10. The enveloped material 103 formed in the enveloping state as mentioned above is formed into a tubular shape as a whole with a small width, as shown in FIG. 5, and can be prevented from protruding to an outer side of the collar portion 97. The enveloped material 103 is preferably bound by using a binding member 104 which is broken by the inflation mentioned later of the bag body 5. For example, as shown in FIG. 5, it is bound at vertical intervals of about 1 m.

In the case that a rubber band or a paper string is used as the binding member 104, the rubber band or the paper string is broken by going beyond its allowable tensile force due to the inflation of the bag body 5, so that the bag body 5 can continuously inflate. Further, a pair of surface-like fasteners which can be engaged with each other and can be disengaged from each other can be used as the binding member 104. In this case, one surface-like fastener is attached to one edge portion of the enveloped material 103, and the other surface-like fastener is attached to the other edge portion side (the other edge portion of a closer side to the other edge portion) of the enveloped material 103. Therefore, the bag body 5 comes to a desired inflation state by setting the bag body 5 to an enveloping state so as to envelop the outer tube 10 and thereafter setting both the surface-like fasteners to a mutually detachable engagement state. As a result, the engagement state of both the surface-like fasteners is canceled. In the present invention, the cancellation of the engagement between both the surface-like fasteners is called as the breakage of the surface-like fastener. In the case that the surface-like fastener is broken, the bag body 5 can continuously inflate.

The enveloped material 103 bound by the binding member 104 is taken down toward a bottom portion of the accommodation hole portion 3 from an upper end 47 thereof by utilizing its own weight of the weight 99. At this time, it is possible to lower the enveloped material 103 while suppressing its elongation since the outer tube 10 is positioned in an inner portion of the enveloped material 103 and the outer tube 10 serves as a tensile force bearing core member.

Particularly, in the present embodiment, since the warp extending direction of the warp knitted tube member 50 is aligned with the extending direction of the bag body 5 (the extending direction of the enveloped material 103), it is possible to lower while further suppressing the elongation. Further, in the present embodiment, since the expanded protection portion 98 is provided in such a manner as to protrude to an outer side of the outer peripheral surface of the upper member 62, it is possible to more smoothly lower the bottom member 57 which forms a lower end portion of the enveloped material 103 while making a lateral oscillation within the hole portion 37 less, when lowering the enveloped material 103.

Further, in a state in which the accommodated object 102 is desirably taken down within the accommodation hole portion 3, the outer tube 10 can achieve its self-standing state extending in the vertical direction within the hole portion 37 on the basis of its rigidity. In this state, the bag body 5 is in an arranged state of being accommodated in the accommodation hole portion 3 and extending in the vertical direction.

Thereafter, the cylindrical casing 36 (FIG. 5) is sequentially pulled up while being rotated and is removed. In this removing work, the cylindrical casing 36 can be easily passed through the upper portion of the bag body 5 and be detached, since the bag body 5 is in an arranged state of being extended in the vertical direction via the outer tube 10. FIGS. 6A and 6B show a state in which the cylindrical casing 36 is removed. Since the inner wall portion 11 after the cylindrical casing 36 is pulled up as mentioned above is protected by the bentonite as mentioned above, the collapse of the inner wall portion 11 is suppressed.

Figure 22A:
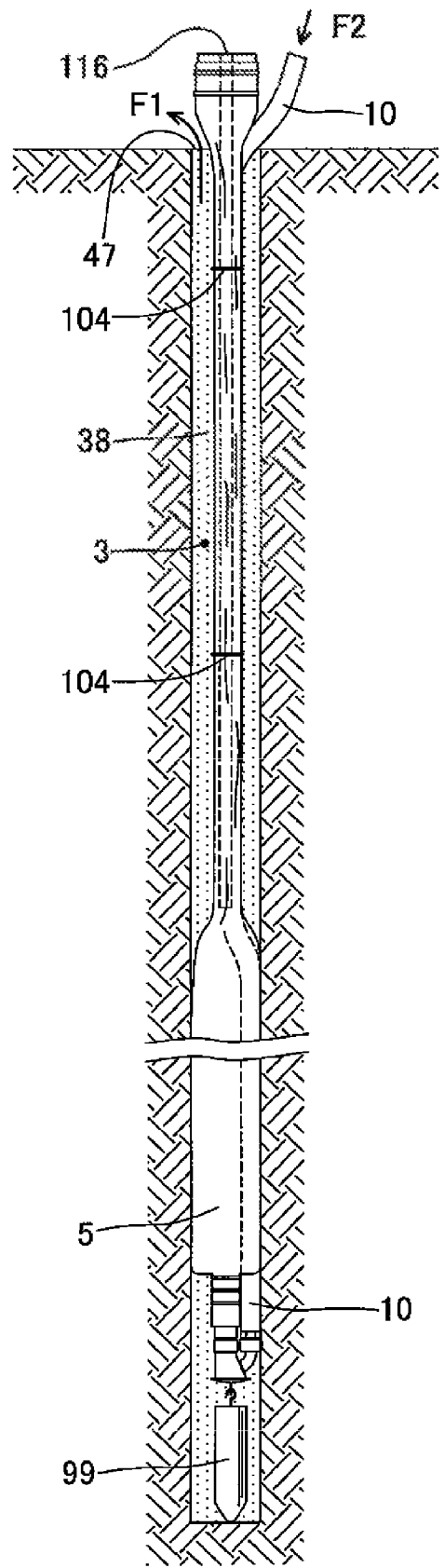
FIGS. 22A and 22B are explanatory views of a partial cross section describing a process of sequentially inflating the bag body accommodated in the accommodation hole portion from its lower side toward its upper side.
Figure 22B:
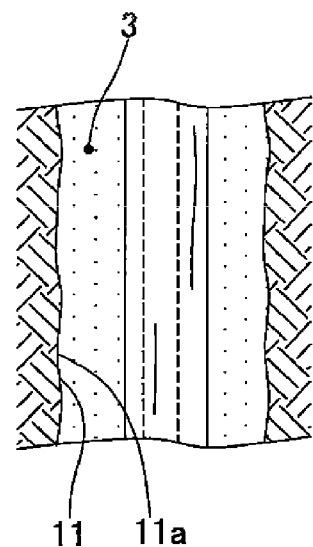

In this state, the bag body 5 is sequentially inflated from its lower side toward its upper side by supplying the water with the pump from the upper end of the outer tube 10 (an arrow F2) and sequentially supplying the water into the bag body 5 in the enveloped state, as shown in FIGS. 22A and 22B. The inflation is carried out together with the discharge of the residual air within the bag body 5 from the upper end open portion 116 in a state in which the plug body 113 (FIG. 16) is detached from the columnar member 105. The inflation is carried out together with the open of the enveloped state of the bag body 5, and the bentonite blending solution 38 within the accommodation hole portion 3 is sequentially discharged from the upper end 47 of the accommodation hole portion 3 as shown by the arrow F1 in FIG. 22A together with the inflation of the bag body 5. After the inflation of the bag body 5 accompanying the discharging is finished, the upper end open portion 116 of the through hole 106 is closed by threadably engaging and fastening the plug body 113 with and to the upper thread hole 111. The bag body 5 is further inflated by further supplying the water with the pump from the upper end of the outer tube 10 in this state, and the outer surface portion 6 of the bag body 5 comes to a closely contact state with the outer tube 10 and the inner wall portion 11 of the accommodation hole portion 3 as shown in FIG. 23B in conjunction with the water pressure increase.

The bag body 5 is inflated while the enveloped state is opened. As a result, the binding member 104 (FIG. 22A) such as the rubber band, the paper string and the surface-like fastener is broken. On the basis of the inflation of the bag body 5 mentioned above, the outer tube 10 comes to a state of being accommodated within the accommodation hole portion 3 in a state of being pinched between the outer surface portion 6 of the bag body 5 and the inner wall portion 11 of the accommodation hole portion 3, as shown in FIG. 3. More particularly, the outer tube 10 comes to a state of being supported by the inner wall portion 11 of the accommodation hole portion 3 on the basis of the inflation of the bag body 5, and the outer surface portion 44 of the outer tube 10 in the supported state comes to a state of being covered with the desired width portion 12 of the outer surface portion 6 in the bag body 5 as seen in the circumferential direction. Further, the other portion 13 than the desired width portion 12 of the outer surface portion 6 comes to a state of covering the inner wall portion 11 in a closely contact state.

Figure 24:
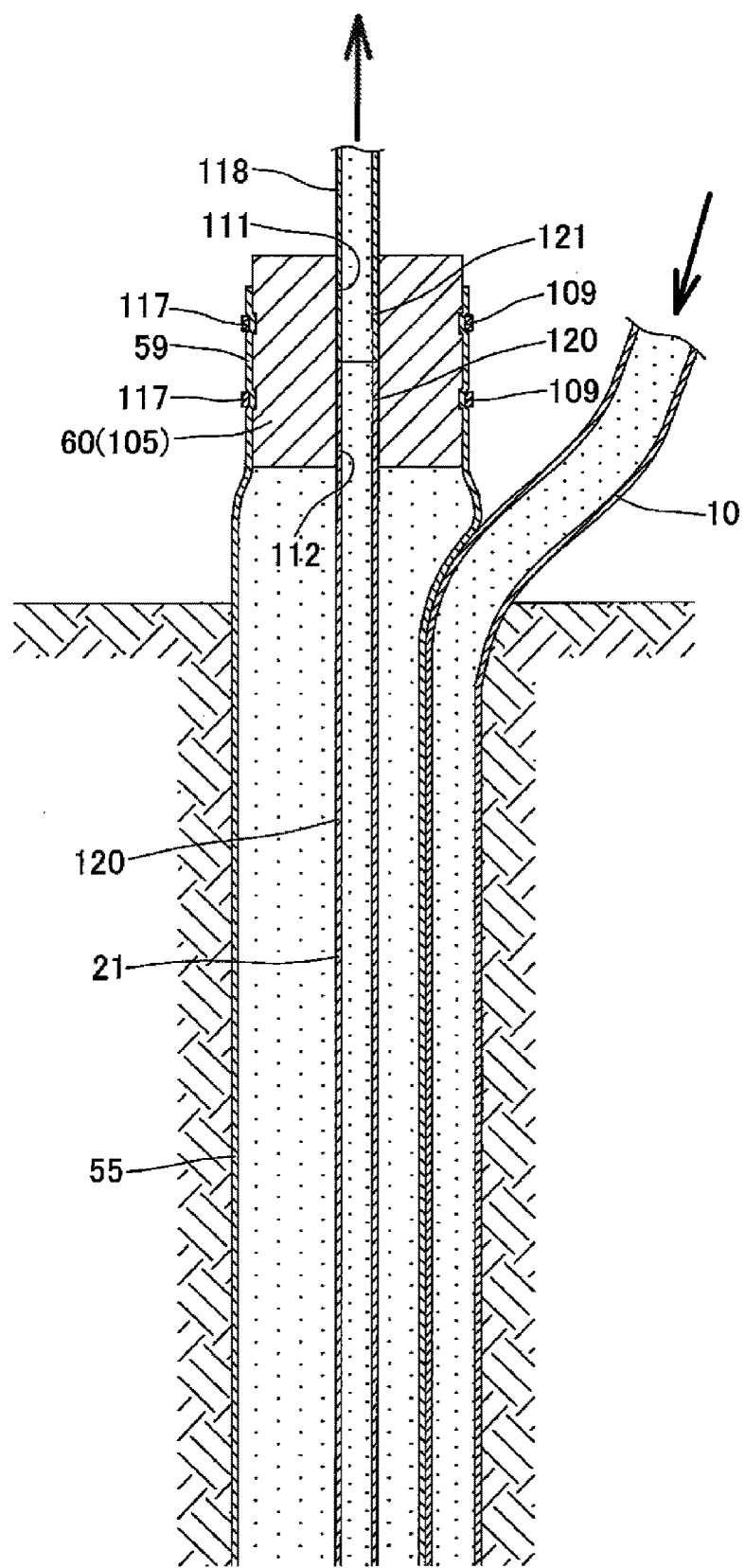
FIG. 24 is a vertical cross sectional view describing a step of hardening a hardening resin with hot water.

Thereafter, the male thread piping portion 121 of the upper tube member 118 is threadably engaged with the upper thread hole 111 (FIG. 17) after detaching the plug body 113 (FIG. 16) as shown in FIG. 24. The hot water having a temperature which can harden the hardening resin is sequentially supplied to the outer tube 10 on the basis of the operation of the pump in this state, the water within the bag body 5 is discharged in the upper end of the upper tube member 118 in conjunction with the supply, and the discharged water is supplied to the outer tube 10 as the hot water while being heated by a boiler to a desired temperature.

By continuing this operation for a desired time period, there is formed the lining tube body 15 in which the FRP reinforced by the hardened material of the core member 46 is interposed between the flexible inner bag 39 and the flexible outer bag 40, as shown in FIGS. 1A, 1B, 2A, 2B, 8A and 8B, on the basis of the hardening of the hardening resin. The lining tubular body 15 serves as the liquid storage tank 19. Since the lining tubular body 15 is constructed by using the warp knitted tube member 50 (FIG. 8B) in addition to the excellent water proofing property of the lining tubular body 15, the lining tubular body 15 has a high coefficient of thermal conductivity and is excellent in strength. The outer tube 10 is in a state of being pinched between the desired width portion 129 of the outer surface portion 127 in the lining tubular body 15 and the inner wall portion 11 of the accommodation hole portion 3, as shown in FIGS. 2A and 2B. Further, the other portion 130 than the desired width portion 129 of the outer surface portion 127 is in a state of covering the inner wall portion 11 in the closely contact state.

In the present embodiment, an air layer 132 for absorbing the inflation is provided in the upper portion of the liquid storage tank 19 structured as mentioned above, taking into consideration the inflation of the heat medium liquid 17 within the liquid storage tank 19, as shown in FIGS. 1A and 1B. The volumetric capacity of the air layer 132 is set, for example, such that the inflation can be absorbed even in the case that the heat medium liquid 17 is inflated in the summer season. As a result, it is possible to prevent the liquid storage tank 19 from being broken by the inflation, and it is possible to prevent the lid member 60 from being detached by the pressure of the inflation. In the present embodiment, the air layer 132 is provided in the upper portion of the liquid storage tank 19 at a vertical length of about 50 to 100 cm. The air layer 132 provided in the upper portion of the liquid storage tank 19 as mentioned above also serves as a heat insulating layer for making the heat medium liquid 17 hard to be affected by the ambient temperature in the land surface.

A description will be given of an action of the underground heat exchanger 1 having the structure mentioned above in the winter season and the summer season, respectively. In the winter season, the temperature of the circumferential underground where the liquid storage tank 19 is buried is relatively higher than the surface temperature of the heat absorbing and radiating area, for example, requiring snow melting.

As a result, the underground heat exchanger 1 is actuated as follows in this case. More specifically, in FIGS. 1A and 1B, the heat medium liquid 17 cooled for melting snow in the process of passing through the heat absorbing and radiating tube portion 26 is flowed into the liquid storage tank 19 from the lower end 7 of the outer tube 10 by driving the pump 33. At the same time, the heat medium liquid 17 is fed to the heat absorbing and radiating tube portion 26 from the lower end 125 of the inner tube 21. As a result, the heat medium liquid 17 flowing into the liquid storage tank 19 from the lower end 7 of the outer tube 10 lowers the temperature of the heat medium liquid 17 which is stored within the liquid storage tank 19. However, since the heat transfer is generated from a circumferential underground 133 having a relatively high temperature to the heat medium liquid within the liquid storage tank 19, the heat medium liquid 17 within the liquid storage tank 19 is heated little by little.

Further, since the residual portion 130 of the outer surface portion 127 in the lining tubular body 15 which constructs the liquid storage tank 19 is in the closely contact state with the inner wall portion 11, as shown in FIGS. 2A and 2B, the heat transfer from the circumferential underground 133 to the heat medium liquid 17 within the liquid storage tank 19 is effectively generated. In addition, since the outer tube 10 is in contact with the inner wall portion 11 of the accommodation hole portion 3, the heat transfer is generated from the underground 133 to the heat medium liquid 17 within the outer tube 10, and the heat medium liquid 17 within the outer tube 10 is expected to be heated, and the heat efficiency of the underground heat exchanger 1 is expected to be improved.

Further, since the outer tube 10 does not exist within the liquid storage tank 19, any direct heat transfer (the heat transfer as described in the Patent Literatures 1 and 2) is not generated from the heat medium liquid 17 within the liquid storage tank 19 toward the heat medium liquid 17 within the outer tube 10. In the case that the outer tube 10 exists within the liquid storage tank 19, the heat transfer is generated from the heat medium liquid 17 which is concentrated in the upper portion within the liquid storage tank 19 and is warmer toward the heat medium liquid 17 within the outer tube 10, and the temperature of the heat medium liquid 17 in the upper portion is lowered, thereby lowering the heat efficiency of the underground heat exchanger 1. The outer tube 10 is partly in contact with the outer surface 127 of the lining tubular body 15, however, a wall portion 136 (FIGS. 2A and 2B) of the lining tubular body 15 and a wall portion 137 (FIGS. 2A and 2B) of the outer tube 10 have the heat insulating property. Therefore, the heat transfer is hardly generated from the heat medium liquid 17 within the liquid storage tank 19 toward the heat medium liquid 17 within the outer tube 10.

In the present embodiment, the heated heat medium liquid 17 is structured such as to be sucked by a lower end 125 of the inner tube 21 and the lower end 125 is arranged in the upper portion of the liquid storage tank 19 as mentioned above because the warm heat medium liquid is collected in the upper portion within the liquid storage tank 19.

On the contrary, the temperature of the circumferential underground in which the liquid storage tank 19 is buried is relatively lower than the temperature of the area to be heat radiated, in the summer season. As a result, the underground heat exchanger 1 is actuated as follows in this case. More specifically, the heat medium liquid 17 passing through the heat absorbing and radiating tube portion 26 and temperature raised in the process of cooling the area to be heat absorbed is flowed into the liquid storage tank 19 from the lower end 125 of the inner tube 21 by driving the pump 33. At the same time, the heat medium liquid 17 flowing into the liquid storage tank 19 from the lower end 125 of the inner tube 21 raises the temperature of the heat medium liquid 17 stored within the liquid storage tank 19, by flowing the heat medium liquid 17 into the liquid storage tank 19 from the lower end 7 of the outer tube 10. However, since the heat transfer is efficiently generated from the heat medium liquid 17 within the liquid storage tank 19 to the circumferential underground which is relatively lower in its temperature, the temperature of the heat medium liquid 17 within the liquid storage tank 19 is lowered little by little.

Further, since the cooler heat medium liquid is collected in the lower portion of the liquid storage tank 19, the cooler heat medium liquid is fed to the heat absorbing and radiating tube portion 26 from the lower end 7 of the outer tube 10. In this case, the outer tube 10 does not exist within the liquid storage tank 19 in the same manner as mentioned above. Therefore, any direct heat transfer as described in the Patent Literatures 1 and 2 is not generated from the heat medium liquid within the liquid storage tank 19 toward the heat medium liquid within the outer tube 10. In the case that the outer tube 10 exists within the liquid storage tank 19, the heat medium liquid 17 within the liquid storage tank 19 is in a state of being warmer in its upper side, and the heat transfer is accordingly generated from the warmer heat medium liquid 17 toward the cooler heat medium liquid 17 rising up within the outer tube 10. As a result, the temperature of the heat medium liquid 17 within the outer tube 10 is raised, thereby lowering the heat efficiency of the underground heat exchanger 1.

Further, in the present embodiment, since the inner wall portion 11 is formed into the concavo-convex surface shape as shown in FIG. 23B, an inner peripheral surface 139 of the lining tubular body 15 is formed into a concavo-convex surface shape. As a result, the concavo-convex surface can generate turbulent flow in the heat medium liquids when the heat medium liquid 17 flowing into the liquid storage tank 19 from the lower end of the outer tube 10 moves upward, and when the heat medium liquid flowing into the liquid storage tank 19 from the inner tube 21 moves downward. Therefore, it is possible to improve the moving efficiency of the underground heat in relation to the heat medium liquid 17 within the liquid storage tank 19.

Embodiment 2

Figure 25:
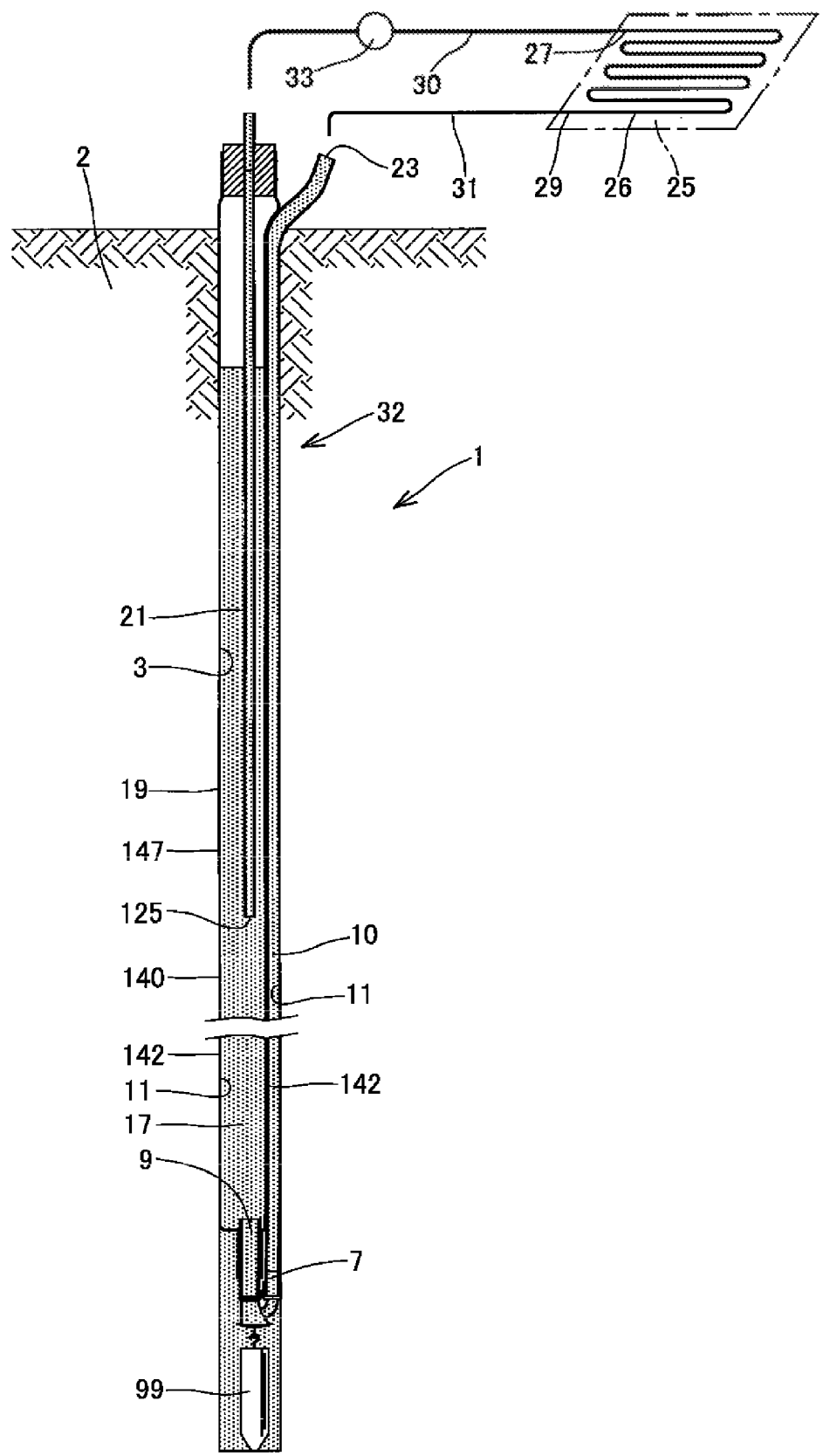
FIG. 25 is an explanatory view describing the other aspect of the underground heat exchanger according to the present invention.
Figure 26:
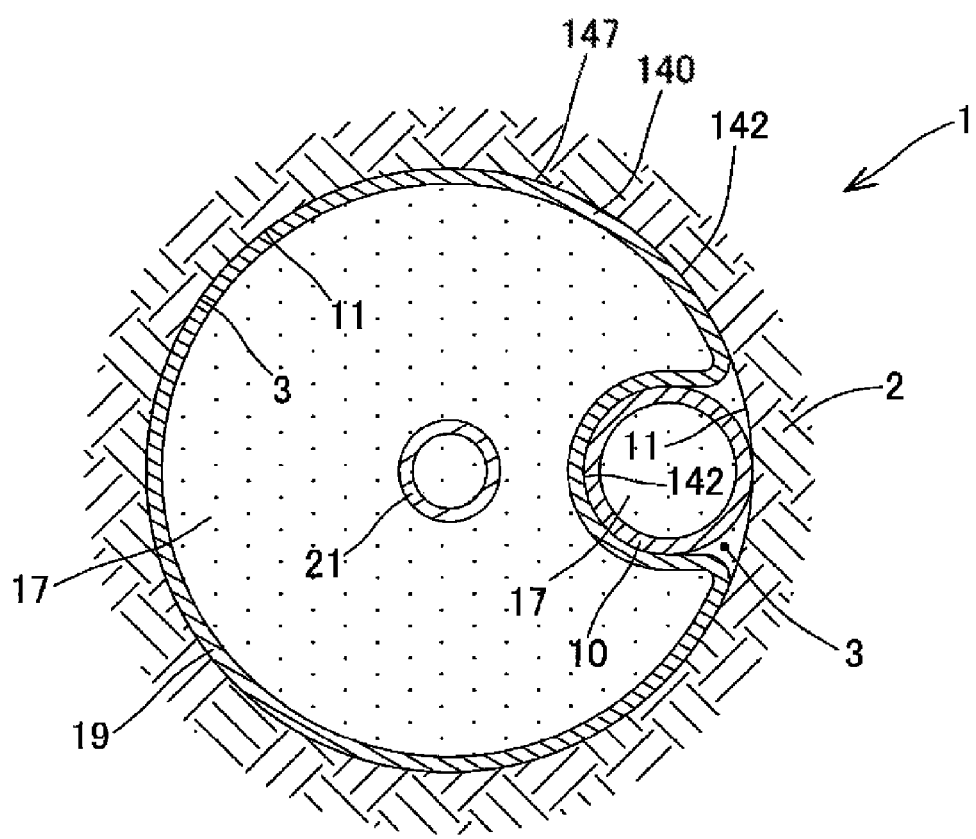
FIG. 26 is a transverse cross sectional view describing the underground heat exchanger.

FIGS. 25 to 26 show the other embodiment of the underground heat exchanger 1 according to the present invention, and the underground heat exchanger 1 is provided with a bottomed tubular flexible bag body 140 which is accommodated in the accommodation hole portion 3 arranged in the ground 2 in the vertical direction and extends in the vertical direction, and the outer tube 10 which is accommodated in the accommodation hole portion 3 and is communicated in its lower end 7 with a lower end 9 of the bag body 140. The bag body 140 has a water proofing property and can form the liquid storage tank 19 for storing the heat medium liquid 17. In a state in which the bag body 140 is inflated, an outer surface portion 142 of the bag body 140 can cover the inner wall portion 11 of the accommodation hole portion 3 in a closely contact state. Further, the outer tube 10 is structured, as shown in FIGS. 25 and 26, such as to be pinched between the outer surface portion 142 of the bag body 140 and the inner wall portion 11.

Figure 27:
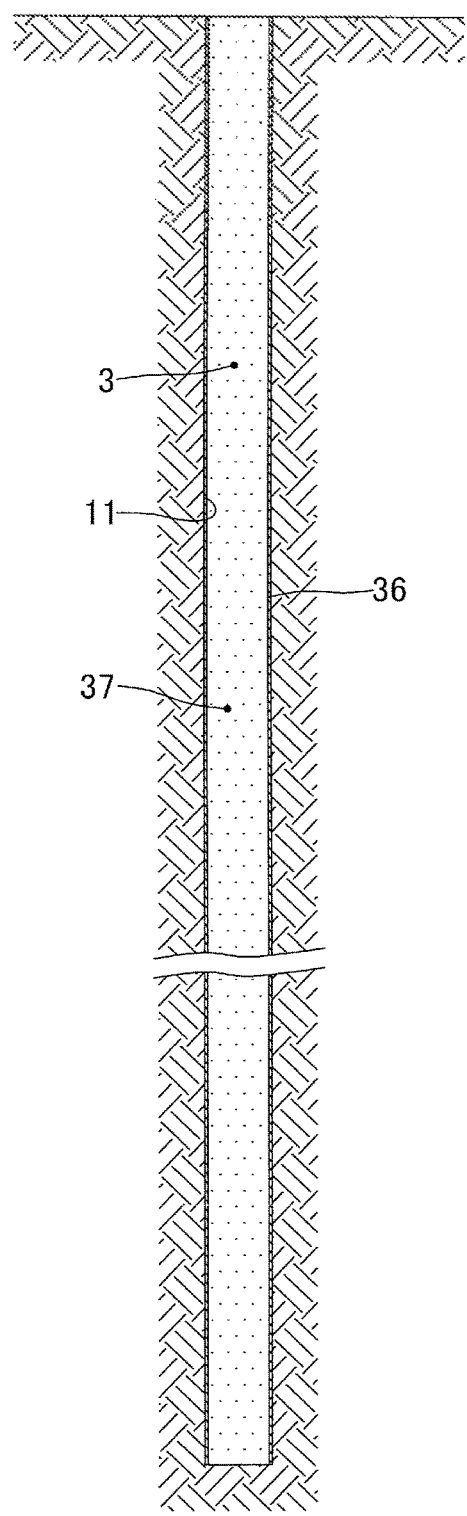
FIG. 27 is a vertical cross sectional view showing a hole portion formed by covering an inner wall portion of the accommodation hole portion provided on the ground in the vertical direction with a cylindrical casing when constructing the underground heat exchanger.

When constructing the underground heat exchanger 1, the ground is excavated at a desired depth together with the cylindrical casing 36 in a state in which the excavation bit is expanded its diameter in the same manner as described on the basis of FIGS. 4A and 4B in the embodiment 1. FIG. 27 shows a hole portion 37 which is formed by covering the inner wall portion 11 of the accommodation hole portion 3 formed by the excavation bit and having a depth, for example, of about 50 m with the cylindrical casing 3. The cylindrical casing 36 is structured such as to protect the inner wall portion 11 of the accommodation hole portion 3 which is formed by the excavation, and is about 150 mm in its inner diameter and about 165 mm in its outer diameter in the present embodiment. In the same manner as mentioned above, the length of one cylindrical casing 36 is between 1 and 3 m, for example, about 2 m. As a result, the desired number of cylindrical casings 36 are elongated by welding their end portions or threadably bonding their end portions.

Figure 28:
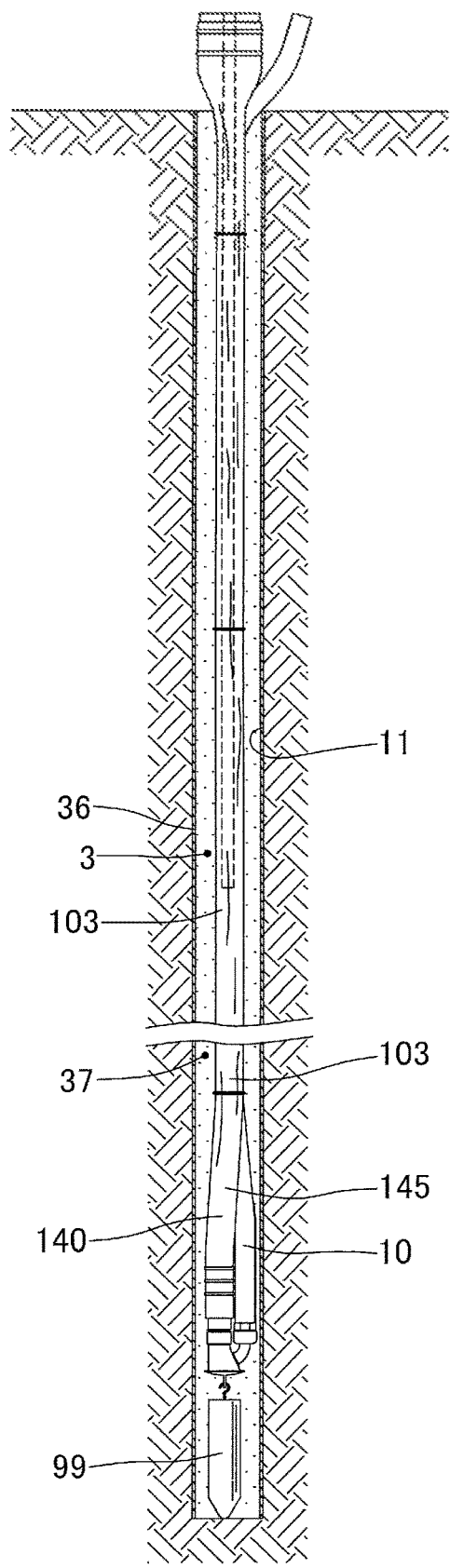
FIG. 28 is a vertical cross sectional view showing a state in which an accommodated member constructed by the bag body, the outer tube and a weight is accommodated in the hole portion.
Figure 29A:
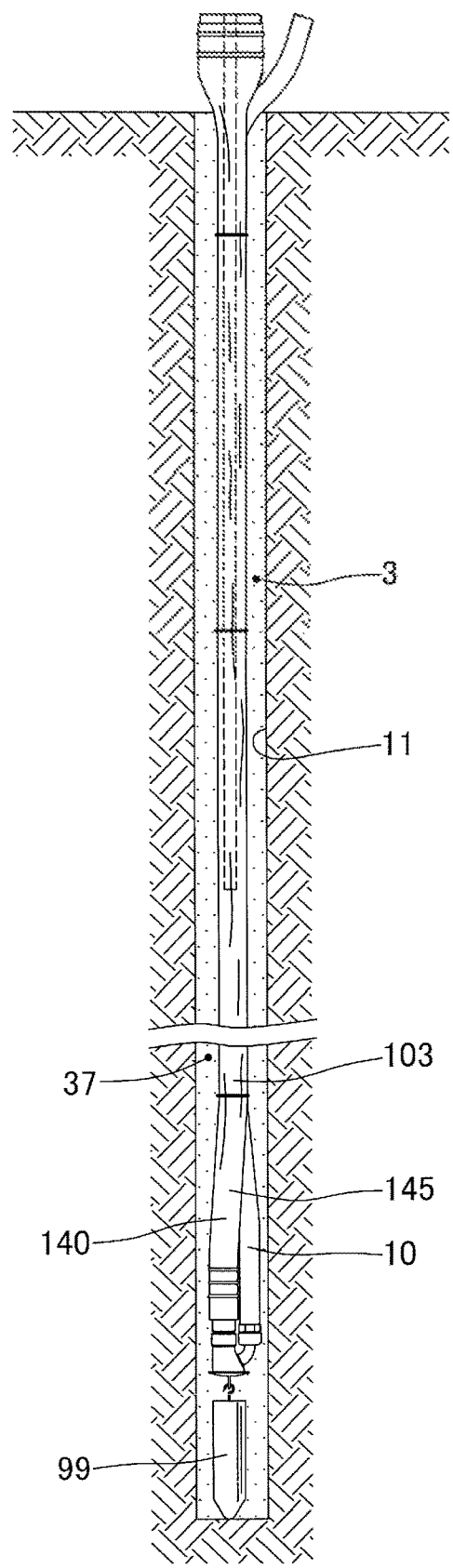
FIGS. 29A and 29B are explanatory views of a partial cross section showing a state in which a lining tubular body is removed after accommodating as mentioned above.
Figure 29B:
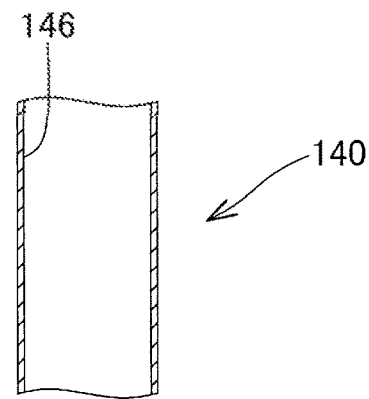

After an accommodated object 145 constituted by the weight 99, the bag body 140 and the outer tube 10 is accommodated as shown in FIG. 28 in the hole portion 37 formed as mentioned above, the cylindrical casing 36 is sequentially pulled up and removed as shown in FIGS. 29A and 29B.

The bag body 140 is formed into a hose shape, for example, made of polyester woven fabric, as shown in FIG. 29B, in the present embodiment, is coated in an inner surface 146 thereof with a polyester resin and has a water proofing property and a pressure resistance. The bag body 140 is not formed by the hardening resin as mentioned above. Therefore, the bag body 140 is different from the bag body 5 which is formed by the hardening resin according to the above embodiment, and does not construct the lining tubular body 15 mentioned above. The inflating state of the bag body 14 is retained only by the water pressure of the heat medium liquid 17 which is stored within the bag body 140 as shown in FIG. 26.

Therefore, according to the bag body 140, the bag body 140 is inflated by supplying the water into the bag body 140 from the upper end of the outer tube 10 by the pump, and the outer surface portion 147 of the bag body 140 comes to a state of covering the inner wall portion 11 of the accommodation hole portion 3 in a closely contact state. As a result, there comes to a state in which a liquid protection member is interposed between the inner wall portion 11 and the outer surface portion 147. The collapsing of the inner wall portion 11 is prevented by the thereafter hardening of the liquid protection member. Further, the outer tube 10 comes to a state of being pinched between the outer surface portion 142 of the bag body 140 and the inner wall portion 11 as shown in FIG. 26, in the same manner as that of the embodiment 1 mentioned above in this state.

Since the operating state of the underground heat exchanger 1 having the bag body 140 having the structure mentioned above is the same as mentioned above, a description thereof will be omitted.

Embodiment 3

It goes without saying that the present invention is not limited to the structures shown by the embodiments mentioned above, but can be variously design changed and modified within the description in "Claims". Some examples thereof will be listed up as follows.

Figure 30:
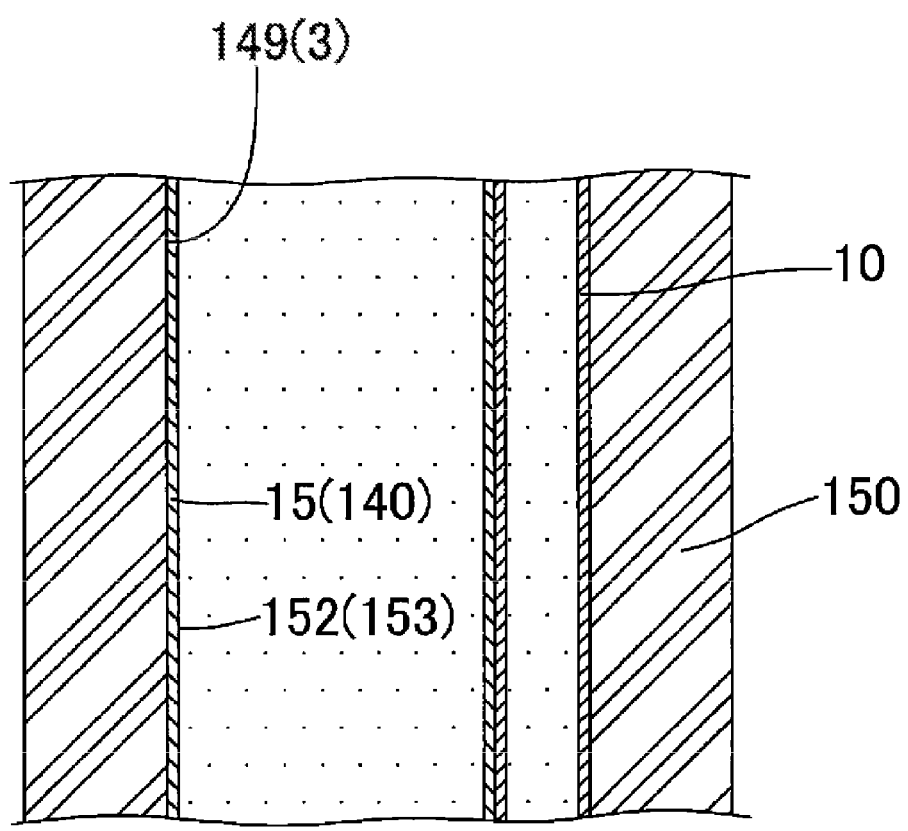
FIG. 30 is a vertical cross sectional view showing a liquid storage tank which is constructed by using a pile made of concrete.

(1) The accommodation hole portion 3 may be constructed by a hole portion 149 of a concrete pile 150 which has the hole portion 149 in a vertical direction, for example, as shown its partial cross sectional view in FIG. 30, in addition to the accommodation hole portion 3 constructed by excavating the ground in the vertical direction. Alternatively, the accommodation hole portion may be constructed by a hole portion 149 of a steel tube pile 151 which has the hole portion 149 in the vertical direction, for example, as shown its partial cross sectional view in FIG. 31.

Figure 31:
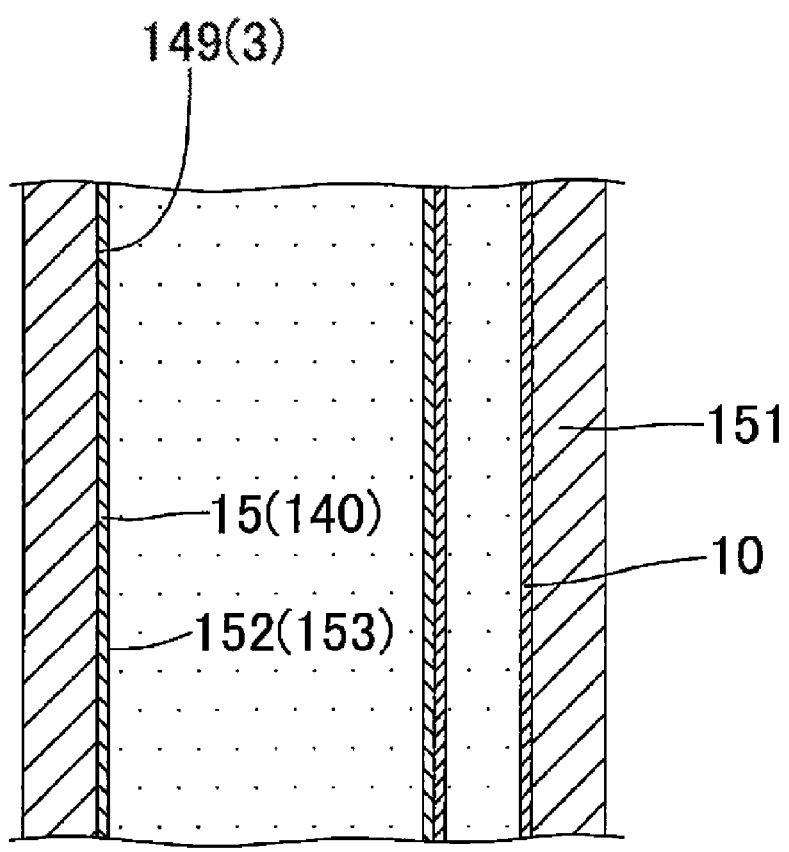
FIG. 31 is a cross sectional view showing a liquid storage tank which is covered with a lining tubular body constructed by using a pile made of steel tube.
Figure 32:
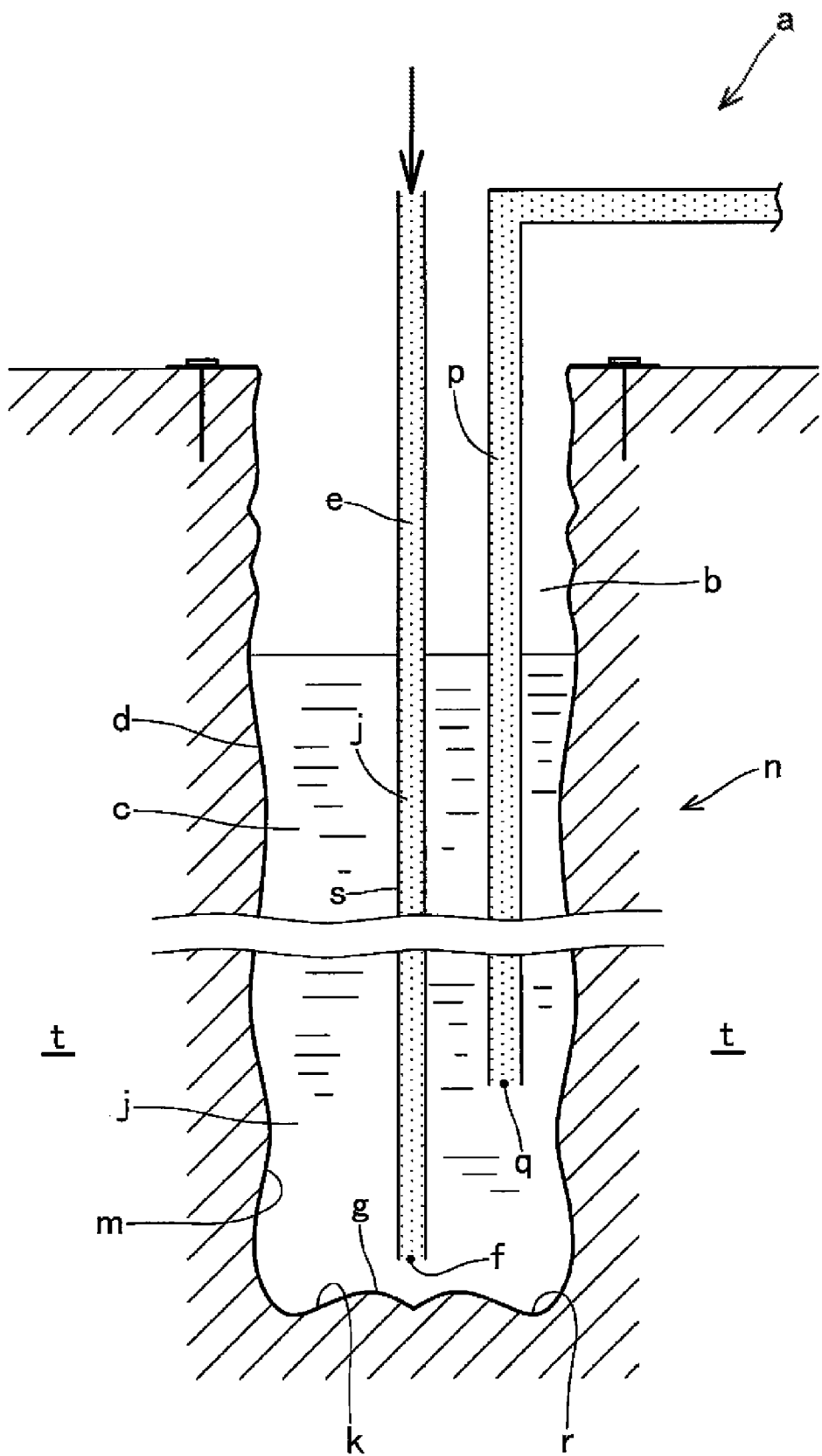
FIG. 32 is a cross sectional view describing a conventional underground heat exchanger.

In these cases, in the same manner as mentioned above, an inner surface 152 of the hole portion 149 (the accommodation hole portion 3) is set to a state of being covered with the lining tubular body 15 in the same manner as mentioned above, or a state of being covered with the bag body (which is not formed by the hardening resin) 140 mentioned above. In FIGS. 30 and 31, the outer tube 10 is arranged in the same manner as that in the embodiment 1 and the embodiment 2. In this case, since the hole portion 149 is a smooth surface, the inner peripheral surface 152 of the lining tubular body 15 or an inner peripheral surface 153 of the bag body (which is not formed by the hardening resin) 140 is formed into a smooth surface. The inner surface of the concrete pile 150 or the steel tube pile 151 is covered with the lining tube body 15 or the bag body 140. As a result, it is possible to prevent calcium carbonate from precipitating from the inner surface of the hole portion 149 of the pile 150 particularly in the case of the concrete pile 150, so that it is possible to prevent the calcium carbonate from clogging the piping of the heat pump. Further, in the case of the steel tube pile 151, it is possible to prevent rust from being generated in the inner surface of the hole portion 149, and it is possible to prevent the rust from clogging the piping of the heat pump. As mentioned above, the bentonite is not required in the case of using the concrete pile or the steel tube pile. The concrete pile is preferably used also as a support pile which supports the building.

(2) In the case that the accommodation hole portion 3 is formed by excavating the ground, the accommodation hole portion 3 may be formed by excavating a rock bed. In this case, the bag body 5 or the bag body 140 can be inflated by the air. Further, in this case, the cylindrical casing 36 and the bentonite is not necessarily used when excavating.

(3) In the case that the flexible annular base member 42 is set to the warp knitted tube member 50, the raw material thereof may be a carbon fiber in addition to the glass fiber.

(4) The flexible annular base member 42 constructing the core member 46 can be constructed by using the warp knitted tube member 50 and can be also constructed by using a felt, a woven fabric, an unwoven fabric or a Japan paper.

(5) The liquid hardening resin 43 may be of an ultraviolet hardening type in addition to the thermal hardening type. In the case of the thermal hardening type, a hardening temperature thereof can be set to 65° C. or 80° C. Alternatively, the hardening temperature may be set to a naturally hardening temperature.

(6) In order to improve a coefficient of thermal conductivity of the liquid hardening resin 43, the resin may be mixed with aluminum oxide or silicon carbide.

(7) As the means for thermally hardening the liquid hardening resin 43, it is possible to employ a power feeding heat generating means which utilizes heat generation caused by the power feeding. One example of the power feeding heat generating means is the means which hardens by knitting or weaving a heating wire such as a copper wire (for example, having a diameter between 0.4 and 0.6 mm) generating heat with an electric current to the flexible inner bag 39 or the flexible outer bag 40 in an extending direction or a horizontal direction or a diagonal direction of the bag body 5 so as to arrange approximately in an even state, by power feeding with a battery so as to generate heat. When constructing as mentioned above, it is possible to thermally harden the liquid hardening resin of the bag body 5 without necessity of a great power, by compartmentalizing the bag body 5 having the flexibility into a plurality of sections (for example, for sections) with a desired width in a circumferential direction thereof, constructing the heat generating portion in each of the sections and power feeding the heat generating portions.

(8) The outer tube 10 may be formed as a tube made of a synthetic resin such as a tube made of vinyl chloride or a tube made of polyethylene.

(9) By the provision of a spiral guiding protrusion portion from its lower end toward its upper end in an inner peripheral surface of the constructed lining tubular body 15, it is possible to spirally move the heat medium liquid which flows into the liquid storage tank 19 from the lower end of the outer tube 10 and rises up and the heat medium which flows into the liquid storage tank 19 from the inner tube 21 and lowers down, in an upward direction or a downward direction along the spiral guiding protrusion portion. As a result, since it is possible to raise or lower the heat medium liquid while bringing the heat medium liquid 17 within the liquid storage tank 19 into contact with the inner peripheral surface 139 of the lining tubular body 15 as much as possible, it is possible to improve a moving efficiency of the underground heat into the heat medium liquid within the liquid storage tank 19.

(10) The bottom member 57 may be constructed by connecting the upper portion of the lower member 63 to the lower portion of the upper member 62 by welding or adhesive bonding.

(11) The bottom portion 57 may be integrally molded by resin.

(12) The bag body 5 has the flexibility before being hardened, and the outer surface portion 6 of the bag body 5 can cover the inner wall portion 11 of the accommodation hole portion 3 in the closely contact state in the state in which the bag body 5 is inflated, and may be constructed in a bag shape which is formed by a single hardening resin.

(13) In the present invention, the feature that the outer surface portion 6 of the bag body 5 covers the inner wall portion 11 of the accommodation hole portion 3 in the closely contact state is not the case that the outer surface portion 6 covers the inner wall portion 11 in a state in which the outer surface portion 6 entirely comes into contact with the inner wall portion 11 in a surface shape, but includes the case that the outer surface portion 6 covers the inner wall portion 11 in a state in which the outer surface portion 6 partly gets wrinkled.

(14) The binding member 104 formed by desirably binding the enveloped material 103 may be broken prior to the inflation of the bag body 5 as mentioned above. A breaking means using a string material for breaking can be exemplified as a means for breaking.

The breaking means achieves a state in which the other end portion of the string material is positioned on the ground, by passing the string material fixed its one end to the ground fixed portion through each of the binding members in a state of being bound at desired intervals in an extending direction of the enveloped material 103, and folding back the string material upward din the lower end of the lower end binding member in a state in which the enveloped material 103 is accommodated in the accommodation hole portion 3. Further, the string material is structured such as to break the binding member sequentially from the below by sequentially pulling up the other end portion.

For example, in order to more smoothly lower the accommodation object 102 when accommodating the accommodated object 102 including the enveloped material 103 into the accommodation hole portion 3, the bottom member 57 (FIG. 11C) forming the lower end portion of the enveloped material 103 is preferably set to a covered state, as shown in FIG. 5. For that purpose, a cylinder portion is provided in a rising manner by a collar portion 97 (FIGS. 12 to 13) serving as the expanded protection portion 98 which forms an outer peripheral edge portion of the bottom plate portion 86 of the bottom member 57, for example, shown in FIGS. 12 to 13, and the bottom member 57 is set to an accommodated state into the cylinder portion. At this time, a guide convex portion having a lower portion formed into a downward semicircular shape is preferably provided in the lower end of the cylinder portion.

REFERENCE SIGNS LIST 1 underground heat exchanger
2 ground
3 accommodation hole portion
5 bag body
10 outer tube
11 inner wall portion
12 desired width portion
13 residual portion
15 lining tubular body
16 internal space
17 heat medium liquid
19 liquid storage tank
21 inner tube
39 flexible inner bag
40 flexible outer bag
41 annular gap
42 flexible annular base member
43 liquid hardening resin
44 outer surface portion
46 core member
49 desired width portion
50 warp knitted tube member
55 flexible tubular member
56 lower end tube portion
57 bottom member
59 upper end tube portion
60 lid member
61 communicated concave portion
62 upper member
63 lower member
65 communication hole
69 fixing peripheral groove
85 lower end open portion
86 bottom plate portion
97 collar portion
98 expanded protection portion
99 weight
100 locking hole
101 locking piece
113 plug body
115 thread shaft portion
118 upper tube member
120 lower tube member
140 bag body

The invention claimed is:

1. An underground heat exchanger comprising:
a bottomed tubular flexible bag body which is accommodated in an accommodation hole portion disposed under ground in a vertical direction, and extends in the vertical direction; and
an outer tube which is accommodated in the accommodation hole portion, extends in the vertical direction along an outer surface portion of the bottomed tubular flexible bag body from an upper end to a lower end thereof and communicates at a lower end with the lower end of the bottomed tubular flexible bag body,
wherein the bottomed tubular flexible bag body is made of a hardening resin, the outer surface portion of the bottomed tubular flexible bag body can cover an inner wall portion of the accommodation hole portion in a close contact state in a state in which the bottomed tubular flexible bag body is inflated, the bottomed tubular flexible bag body is structured to be hardened in the close contact state of the outer surface portion covering the inner wall portion of the accommodation hole portion, and a lining tubular body formed by the hardening is capable of forming a liquid storage tank for storing a heat medium liquid in its internal space, and
wherein the outer tube is structured to be pinched between the outer surface portion of the bottomed tubular flexible bag body and the inner wall portion.

2. An underground heat exchanger comprising:
a bottomed tubular flexible bag body which is accommodated in an accommodation hole portion disposed under ground in a vertical direction, and extends in the vertical direction; and
an outer tube which is accommodated in the accommodation hole portion, extends in the vertical direction along an outer surface portion of the bottomed tubular flexible bag body on only one side thereof and communicates at a lower end with a lower end of the bottomed tubular flexible bag body,
wherein the bottomed tubular flexible bag body is structured such that a core member obtained by impregnating a flexible base member with a liquid hardening resin is accommodated between a flexible inner bag made of resin and a flexible outer bag made of resin, the outer surface portion of the bottomed tubular flexible bag body can cover an inner wall portion of the accommodation hole portion in a close contact state in a state in which the bottomed tubular flexible bag body is inflated, the bottomed tubular flexible bag body is structured to be hardened in the close contact state of the outer surface portion covering the inner wall portion of the accommodation hole portion, and a lining tubular body formed by the hardening is capable of forming a liquid storage tank for storing a heat medium liquid in its internal space, and
wherein the outer tube is structured such as to be pinched between the outer surface portion of the bottomed tubular flexible bag body and the inner wall portion.

3. An underground heat exchange system comprising:
a bag body having a bottomed tubular flexibility and made of a hardening resin, the bag body being accommodated in an accommodation hole portion which is provided under ground in a vertical direction; and
an outer tube extending along an outer surface portion of the bag body in the vertical direction and communicates at a lower end with a lower end of the bag body, the outer tube being accommodated in the accommodation hole portion,
wherein the bag body in an expanded and hardened state is cylindrical with a first outer diameter and said outer tube is cylindrical with a second outer diameter smaller than said first outer diameter, said outer tube being pinched between a desired width portion of the outer surface portion of the bag body, extending in a circumferential direction, and an inner wall portion of the accommodation hole portion, and a major portion of the outer surface portion is in a state of covering the inner wall portion in a close contact state,
wherein the bag body is structured to be hardened in the covering state, and a lining tubular body formed by the hardening is structured to form a liquid storage tank which can store a heat medium liquid in its internal space,
wherein an inner tube is structured to be arranged in an upper portion of the liquid storage tank in a state of sinking its lower end portion into the heat medium liquid within the liquid storage tank, wherein an upper end of the outer tube is structured to be connected to one end of a heat absorbing and radiating tube portion which is capable of radiating heat in an area where heat radiation is required and can absorb heat in an area where heat absorption is required, and an upper end of the inner tube is structured such as to be connected to the other end of the heat absorbing and radiating tube portion, the upper end of said outer tube and the upper end of said inner tube communicating with one another via said heat absorbing and radiating tube portion, and wherein a pump for circulating the heat medium liquid is interposed.

4. The underground heat exchanger according to claim 1 wherein an inner peripheral surface of the lining tubular body is formed partially into a concave surface and partially into a convex surface.

5. An underground heat exchanger comprising:

a bottomed tubular flexible bag body which is accommodated in an accommodation hole portion disposed under ground in a vertical direction, and extends in the vertical direction; and an outer tube which is accommodated in the accommodation hole portion, extends in the vertical direction along an outer surface of the bottomed tubular flexible bag body and communicates at a lower end with a lower end of the bottomed tubular flexible bag body, wherein the bottomed tubular flexible bag body has a water proofing property and can form a liquid storage tank for storing the heat medium liquid, and an outer surface portion of the bottomed tubular flexible bag body is capable of covering in a closely contact state an inner wall portion of the accommodation hole portion, in a state in which the heat medium liquid is stored in the bottomed tubular flexible bag body and the bottomed tubular flexible bag body is inflated, and wherein the outer tube is of smaller outer diameter than the bottomed tubular flexible bog body and is structured to be pinched between the outer surface portion of the bottomed tubular flexible bag body on only one side thereof and the inner wall portion.

6. The underground heat exchanger according to claim 2 wherein an inner peripheral surface of the lining tubular body is formed partially into a concave surface and partially into a convex surface.

7. The underground heat exchanger according to claim 3 wherein an inner peripheral surface of the lining tubular body is formed partially into a concave surface and partially into a convex surface.

* * * * *